US012722679B1

(12) United States Patent
Dai

(10) Patent No.: US 12,722,679 B1
(45) Date of Patent: Sep. 1, 2026

(54) TRAILER FRAME AND COMBINED TRAILER

(71) Applicant: Hunan Weiyang Technology Co., Ltd, Changsha (CN)

(72) Inventor: Xiaoli Dai, Changsha (CN)

(73) Assignee: Hunan Weiyang Technology Co., Ltd, Changsha (CN)

(*) Notice: Subject to any disclaimer, the term of this patent is extended or adjusted under 35 U.S.C. 154(b) by 0 days.

(21) Appl. No.: 19/568,722

(22) Filed: Mar. 16, 2026

(30) Foreign Application Priority Data

Feb. 13, 2026 (CN) ......................... 202610212446.3
Feb. 13, 2026 (CN) ......................... 202610212507.6

(51) Int. Cl.
*B62B 3/02* (2006.01)
*A01K 1/02* (2006.01)

(52) U.S. Cl.
CPC .............. *B62B 3/02* (2013.01); *A01K 1/0236* (2013.01)

(58) Field of Classification Search
CPC ........................................................ B62B 3/02
See application file for complete search history.

(56) References Cited

U.S. PATENT DOCUMENTS 4,505,495 A * 3/1985 Foss ......................... B62B 3/02 16/113.1
6,079,777 A * 6/2000 Simmons ............... A47C 13/00 297/30
8,641,061 B1 * 2/2014 Sims ....................... B62B 3/108 280/651
9,108,656 B1 * 8/2015 Nolan ....................... B62B 3/02
10,543,862 B1 * 1/2020 Aguirre ..................... B62B 5/06
D938,126 S * 12/2021 You ................................ D34/21
2004/0232660 A1 * 11/2004 Chen ......................... B62B 3/02 280/651
2008/0217503 A1 * 9/2008 Zhuang ..................... B62B 3/02 248/558
2011/0175307 A1 * 7/2011 Tsai ........................ B62B 1/002 280/47.18
2015/0014965 A1 * 1/2015 Gibson ..................... B62B 3/02 280/651
2018/0037244 A1 * 2/2018 Jian ........................... B62B 5/06
2021/0146981 A1 * 5/2021 You ......................... B62B 3/022
2022/0297736 A1 * 9/2022 Hu ............................ B62B 3/02
(Continued)

FOREIGN PATENT DOCUMENTS

CN 223355636 U 9/2025

*Primary Examiner* — Erez Gurari
(74) *Attorney, Agent, or Firm* — Bayramoglu Law Offices LLC

(57) ABSTRACT

A trailer frame and a combined trailer are provided. The trailer frame includes a bottom frame, a snap-fit rod, and a pair of brackets. The pair of brackets are correspondingly provided on both sides of the bottom frame. Two free ends of each of the brackets are correspondingly hinged to the bottom frame, so that the brackets can flip toward an inner side of a top surface of the bottom frame. A hinged end of the snap-fit rod is hinged to the bracket on the identical side. A snap-fit end of the snap-fit rod engages with or disengages from the bracket on the opposite side, and the snap-fit end of the snap-fit rod is further configured to flip toward the plane where the bracket is located. The effective cooperation integrates the reduced occupied height in the stored state and the limiting stability in the use state.

20 Claims, 14 Drawing Sheets

(56) References Cited

U.S. PATENT DOCUMENTS

| | | | | |
|---|---|---|---|---|
| 2023/0303140 | A1* | 9/2023 | Kite | B62B 1/125 |
| 2024/0034378 | A1* | 2/2024 | Squiers | B62B 3/02 |
| 2024/0182094 | A1* | 6/2024 | Fraser | B62B 5/067 |
| 2025/0176709 | A1* | 6/2025 | Ke | A47B 43/00 |

* cited by examiner

TRAILER FRAME AND COMBINED TRAILER

CROSS REFERENCE TO THE RELATED APPLICATIONS

This application is based upon and claims priority to Chinese Patent Application No. 202610212507.6, filed on Feb. 13, 2026, and Chinese Patent Application No. 202610212446.3, filed on Feb. 13, 2026, the entire contents of which are incorporated herein by reference.

TECHNICAL FIELD

The present invention relates to the technical field of folding trailer, specifically to a trailer frame and a combined trailer.

BACKGROUND

Folding trailers are manually operated push-pull trolleys that facilitate the manual transport of objects, pets and others. In certain specific scenarios, such as when traveling by airplane or train, it is often necessary to fold and store the folding trailer to reduce its space occupation and facilitate storage under a seat. Therefore, folding trailers not only need to meet the convenience requirements of manual transport but also require a small space occupation after folding. The frame of the folding trailer is one of the structures that needs to be folded and stored.

Patent with publication number 202423011176.5 discloses a multi-functional camping trailer chair. A backrest frame I is hinged to one side of a rectangular bracket, and armrest frames are provided on both sides of the backrest frame I. The bottom of the other end of the armrest frame is hinged to the side wall of the rectangular bracket via a connecting rod. The armrest frames can be folded along with the folding of the backrest frame I. A backrest frame II is provided on the other side of the rectangular bracket. When storage is required, the backrest frame II is first folded and placed on a grille, then the backrest frame I and the armrest frames are folded and placed on the backrest frame II.

This patent uses a connecting rod structure to achieve the coordinated folding (stored state) or supporting (use state) of the backrest frame I and the armrest frames, and then individually flipping the backrest frame II for folding or supporting, so that a storage space is enclosed by the grille, the backrest frame I, the backrest frame II, and the pair of armrest frames, facilitating the placement of objects, pets and others in the storage space. Although the coordinated structure between the backrest frame I and the armrest frames is convenient to use when folded or supported, and the folded armrest frames occupy a small height, the gap between the armrest frames and the backrest frame II is large in a supporting state, resulting in poor limiting effect for objects placed in the storage space.

Therefore, there is an urgent need for a trailer frame that integrates the reduced occupied height in the stored state and the limiting stability in the use state to meet use requirements.

SUMMARY

(I) Technical Problem to be Solved

In view of the above-mentioned shortcomings and deficiencies of the prior art, the present invention provides a trailer frame and a combined trailer, which solves the technical problems of existing trailer frames being difficult to integrate the reduced occupied height in the stored state and the limiting stability in the use state.

(II) Technical Solution

To achieve the above objectives, the trailer frame of the present invention includes a bottom frame, a snap-fit rod, and a pair of brackets;

the pair of brackets are correspondingly provided on both sides of the bottom frame; and two free ends of each of the brackets are correspondingly hinged to the bottom frame, so that the brackets are configured to flip toward an inner side of a top surface of the bottom frame; and a hinged end of the snap-fit rod is hinged to a bracket on an identical side; a snap-fit end of the snap-fit rod is configured to engage with or disengage from a bracket on an opposite side, and the snap-fit end of the snap-fit rod is further configured to flip toward a plane where the bracket is located.

Optionally, the trailer frame includes a use state;

in the use state, the snap-fit end of the snap-fit rod engages with the bracket on the opposite side, so that the top surface of the bottom frame, the snap-fit rod, and the pair of brackets enclose a storage space.

Optionally, the trailer frame includes a folded state;

in the folded state, the snap-fit end of the snap-fit rod disengages from the bracket on the opposite side, the snap-fit rod flips toward the bracket on the identical side, and the brackets flip toward the inner side of the top surface of the bottom frame, so that the bracket and/or the snap-fit rod correspondingly abut against a top surface of the bottom frame; and the trailer frame is configured to switch between the folded state and the use state.

Optionally, the bracket is constructed as a U-shaped bracket; and the hinged end of the snap-fit rod is hinged to a corner of the bracket on the identical side, and the snap-fit end of the snap-fit rod is configured to engage with or disengage from a corner of the bracket on the opposite side.

Optionally, the snap-fit end of the snap-fit rod engages with a snap-fit cylinder, and the snap-fit cylinder is provided at the corner of the bracket;

the snap-fit end of the snap-fit rod is constructed as a clamping block, and the snap-fit cylinder is correspondingly provided with a clamping block slot matched with the clamping block; and the snap-fit rod is configured to rotate around the hinged end, so that the clamping block engages with or disengages from the clamping block slot.

Optionally, the clamping block and the clamping block slot are correspondingly constructed as a T-shaped clamping block and a T-shaped clamping block slot.

Optionally, the bracket includes a main bracket, a pair of auxiliary brackets, and a pair of dual-passage sleeves; and the pair of dual-passage sleeves are provided at two corners of the brackets in one-to-one correspondence; and the main bracket and the auxiliary brackets are connected through the dual-passage sleeves.

Optionally, the hinged end of the snap-fit rod is hinged with a hinge cylinder, and the hinge cylinder is provided at the corner of the bracket; and the dual-passage sleeve is provided with a plurality of connecting cylinders, and the connecting cylinder is correspondingly detachably connected to the snap-fit cylinder or the hinge cylinder.

Optionally, the snap-fit cylinder and/or the hinge cylinder are configured to flip onto the top surface of the bottom frame.

Optionally, a plurality of second hinge cylinders are provided on the top surface of the bottom frame; and the second hinge cylinders are hinged with free ends of the brackets.

Optionally, a sum of height sizes of the pair of brackets is not greater than a distance between the second hinge cylinders on identical sides of the pair of brackets.

Optionally, the top surface of the bottom frame is constructed as a support surface; and the support surface, the pair of brackets, and a pair of snap-fit rods are configured to enclose a cuboid frame.

Optionally, at least one pair of universal wheels are detachably provided at a bottom of the bottom frame.

Furthermore, the present invention further provides a combined trailer, where the combined trailer includes the above-mentioned trailer frame.

Optionally, the combined trailer further includes a pet carrier bag; and the bottom frame, the snap-fit rod, and the pair of brackets cover an outer side of the pet carrier bag.

Optionally, the combined trailer further includes a folding armrest; and the folding armrest is mounted on the bottom frame, and the folding armrest is configured to rotate from a vertically upward posture to a bottom of the bottom frame.

Optionally, the folding armrest includes an armrest, a snap-fit component, and an adapter;

one end of the snap-fit component is connected to the armrest, and the other end of the snap-fit component is hinged to the adapter; the adapter has a rotational space in which the snap-fit component rotates, and a limiting corner is provided within the rotational space; and the snap-fit component is provided with a clamping strip corresponding to the limiting corner; and during rotation of the snap-fit component around its hinge point, the following sequence occurs:

the clamping strip abuts against and is limited by the limiting corner, and the armrest is in a suspended position; and the clamping strip slides against the limiting corner and passes over its apex, and the armrest enters a folded state.

Optionally, the folding armrest includes a first use state and a second use state, and the rotational space includes a first preset angle and a second preset angle;

in the first use state, the snap-fit component engages with the adapter, the adapter is perpendicular to the armrest, and a rotational angle of the snap-fit component from engaging with the adapter to disengaging from the adapter is the first preset angle; and in the second use state, the snap-fit component disengages from the adapter, the snap-fit component is configured to rotate around its hinge point until the clamping strip abuts against and is limited by the limiting corner, where the rotational angle of the snap-fit component is the second preset angle.

Optionally, the folding armrest further includes a switching state, and the rotational space further includes a third preset angle; and in the switching state, the snap-fit component is configured to rotate around its hinge point, while the clamping strip slides against the limiting corner through an interference fit, and a rotational angle of the snap-fit component from abutting to disengagement of the clamping strip and the limiting corner is the third preset angle.

Optionally, the folding armrest further includes a stored state, and the rotational space further includes a fourth preset angle; and in the stored state, the armrest is in the folded state; after the clamping strip disengages from the limiting corner, the clamping strip rotates around its hinge point until the snap-fit component rotates to under a bottom surface of the adapter, where a rotational angle of the snap-fit component is the fourth preset angle.

(III) Beneficial Effects

The beneficial effects of the present invention are as follows:

The snap-fit end of the snap-fit rod can engage with the bracket on the opposite side, so as to limit the flipping of the pair of brackets toward the inner side of the top surface of the bottom frame. This ensures the connection strength of the trailer frame in the use state, thereby ensuring the limiting effect of objects, pets and others, allowing the objects, the pets and others to be fixedly placed within the storage space, and facilitating subsequent trailing of the trailer frame.

After the snap-fit rod disengages from the bracket on the opposite side, the snap-fit rod folds around its hinge point to be stored. The pair of brackets correspondingly flip toward the inner side of the top surface of the bottom frame, and the pair of brackets are stored on the top surface of the bottom frame, which significantly reduces the height occupied by the trailer frame, and facilitates storing the trailer frame in a small storage space such as under the seat.

The effective cooperation of the bottom frame, the snap-fit rod, and the pair of brackets integrates the reduced occupied height in the stored state and the limiting stability in the use state, improving the user experience. Furthermore, after the snap-fit rod and the pair of brackets are connected, the overall hollow area of the trailer frame is relatively large, improving adaptability to placing irregularly shaped objects on the trailer frame.

EXPLANATION OF REFERENCE NUMERALS IN THE DRAWINGS

Figure 1:
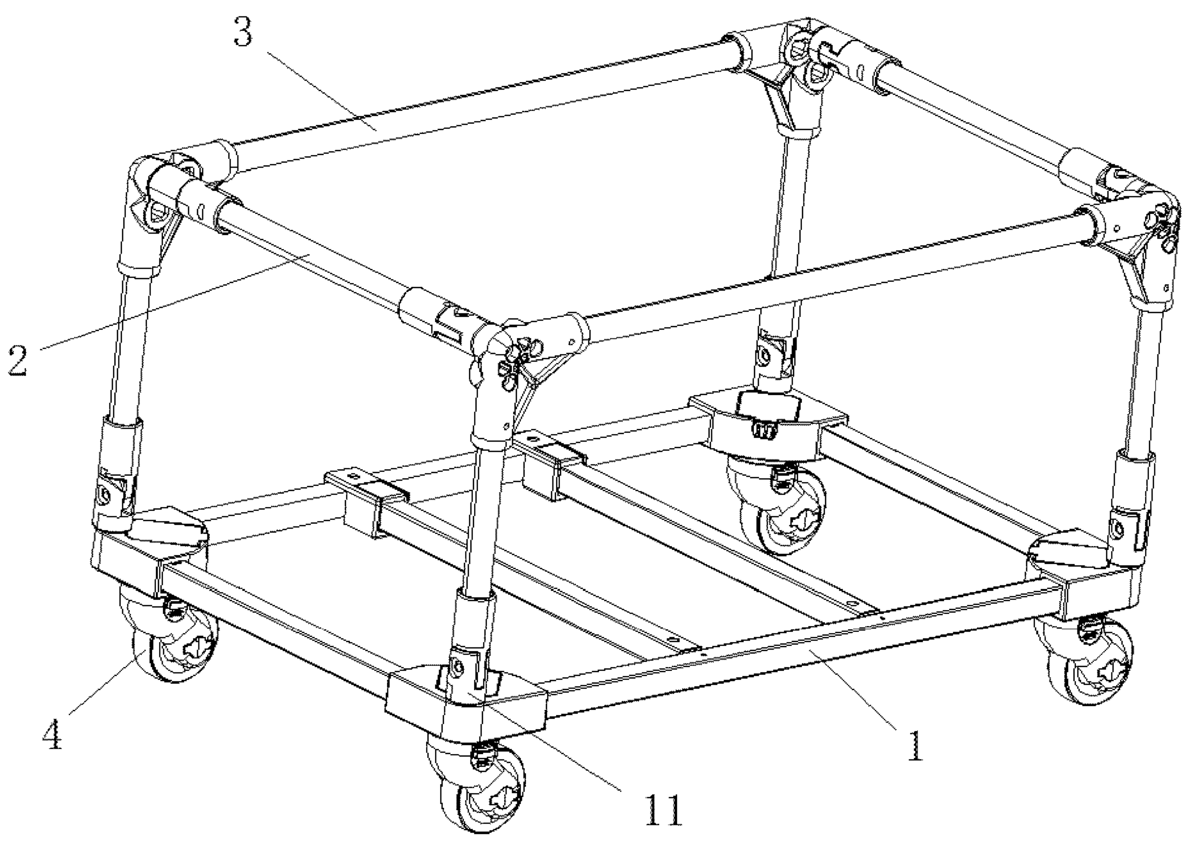
FIG. 1 is a perspective view of a trailer frame according to the present invention.

- 1: bottom frame; 11: second hinge cylinder; 12: peripheral frame; 13: support beam; 14: cover plate;
- 2: snap-fit rod; 21: clamping block; 22: hinge cylinder;
- 3: bracket; 31: snap-fit cylinder; 311: clamping block slot; 32: main bracket; 33: auxiliary bracket; 34: dual-passage sleeve; 341: connecting cylinder;
- 4: universal wheel;
- 5: folding armrest; 51: armrest;
- 52: snap-fit component; 521: clamping strip; 5211: second arc end; 522: clamping slot;
- 53: adapter; 531: adapter block; 5311: side plate; 5312: bottom plate; 5313: limiting corner; 5314: first frame insertion slot; 5315: second frame insertion slot; 5316: rib plate; 532: ear plate; 5321: snap-fit slot; 533: latch;
- 55: sleeve; 551: first limiting surface; 552: second limiting surface; 56: hinge plate; 561: first arc end; and 57: snap-fit plate.

DETAILED DESCRIPTION OF THE EMBODIMENTS

In order to better explain the present invention and facilitate understanding, the detailed description of the present invention is provided below with reference to the drawings and specific embodiments.

It should be noted that all directional indications (such as up, down, left, right, front, back, etc.) in the embodiments of the present invention are only used to explain the relative positional relationships and movement situations of each component in the specific posture (as shown in the drawings). If the specific posture changes, the directional indications will also change accordingly.

Furthermore, descriptions involving "first", "second" and the like in the present invention are only for descriptive purposes and should not be construed as indicating or implying their relative importance or implicitly specifying the number of technical features indicated. Therefore, features defined with "first" or "second" may explicitly or implicitly include at least one of the features. In the description of the present invention, "the plurality of" means at least two, such as two, three, etc., unless otherwise explicitly specified.

In the present invention, unless otherwise explicitly specified and limited, the terms "connection", "fixing" and the like should be interpreted broadly. For example, "fixing" may mean a fixed connection, a detachable connection, or an integral part; "connection" may mean a mechanical connection or an electrical connection; it may mean a direct connection or an indirect connection through an intermediate medium; it may mean an internal communication of two components or the interaction between two components, unless otherwise explicitly limited. Those skilled in the art can understand the specific meaning of the above terms in the present invention according to the specific circumstances.

Referring to FIG. 1, the present invention provides a trailer frame, where the trailer frame includes the bottom frame 1, the snap-fit rod 2, and a pair of brackets 3. The pair of brackets 3 are correspondingly provided on both sides of the bottom frame 1. Two free ends of each of the brackets 3 are correspondingly hinged to the bottom frame 1, so that the brackets 3 can flip toward the inner side of the top surface of the bottom frame 1. A hinged end of the snap-fit rod 2 is hinged to the bracket 3 on the identical side. A snap-fit end of the snap-fit rod 2 engages with or disengages from the bracket 3 on the opposite side.

In an embodiment, the bracket 3 is constructed as an arc-shaped rod. Taking the orientation shown in FIG. 1 as an example, the snap-fit rod 2 is offset from the vertical centerline of the bracket 3, so that in a use state, the snap-fit rod 2 can enclose the front end surface of a storage space. That is, in this embodiment, only the rear end surface of the storage space is not enclosed by the limiting rod. The enclosure described in the present invention refers to setting limiting rods at corresponding positions on the top surface of the bottom frame 1, and then connecting the limiting rods with side limiting rods to enclose the frame structure. However, the interior of the frame structure is hollow, improving the trailer frame's adaptability to placing irregularly shaped objects. Of course, to further improve a limiting capability of the trailer frame in the use state, one bracket 3 can be added to the rear end surface of the storage space.

Optionally, the two free ends of each of the brackets 3 are correspondingly hinged to the top surface of the bottom frame 1, and hinged at the corners of the top surface of the bottom frame 1. That is, a total of four free ends in the pair of brackets 3 are hinged to four corners of the top surface of the bottom frame 1 in one-to-one correspondence, to maximize the enclosure of the large storage space.

The snap-fit end of the snap-fit rod 2 can engage with the bracket 3 on the opposite side, limiting the flipping of the pair of brackets 3 toward the inner side of the top surface of the bottom frame 1. This ensures the connection strength of the trailer frame in the use state, thereby ensuring the limiting effect of objects, pets and others, allowing the objects, the pets and others to be fixedly placed within the storage space, and facilitating subsequent trailing of the trailer frame.

After the snap-fit rod 2 disengages from the bracket 3 on the opposite side, the snap-fit rod 2 folds around its hinge point to be stored. The pair of brackets 3 correspondingly flip toward the inner side of the top surface of the bottom frame 1, storing the pair of brackets 3 on the top surface of the bottom frame 1, which significantly reduces the height occupied by the trailer frame, and facilitates storing the trailer frame in a small storage space such as under the seat. Moreover, due to the different heights of the brackets 3, there are several scenarios where the pair of brackets 3 are stored on the top surface of the bottom frame 1, including a gap formed between the pair of brackets 3 as well as one bracket 3 pressing on the other bracket 3.

The effective cooperation of the bottom frame 1, the snap-fit rod 2, and the pair of brackets 3 integrates the reduced occupied height in the stored state and the limiting stability in the use state, improving the user experience. Furthermore, after the snap-fit rod 2 and the pair of brackets 3 are connected, the overall hollow area of the trailer frame is relatively large, improving adaptability to placing the irregularly shaped objects on the trailer frame.

Furthermore, the trailer frame includes the use state. In the use state, the snap-fit end of the snap-fit rod 2 engages with the bracket 3 on the opposite side, so that the top surface of the bottom frame 1, the snap-fit rod 2, and the pair of brackets 3 enclose the storage space. Specifically, in the use state, objects are placed within the storage space, but the objects can extend out of the storage space through the hollow portion of the trailer frame. This is an advantage of the trailer frame of the present invention in the use state, allowing the storage space to accommodate objects of different sizes and shapes, improving the user experience.

Secondly, the trailer frame includes the folded state. In the folded state, the snap-fit end of the snap-fit rod 2 disengages from the bracket 3 on the opposite side, and the snap-fit rod 2 flips toward the bracket 3 on the identical side, and the brackets 3 flip toward the inner side of the top surface of the bottom frame 1. Specifically, after the snap-fit rod 2 disengages from the bracket 3 on the opposite side, the snap-fit rod 2 can be flipped and folded on the bracket 3 on the identical side. After the snap-fit rod 2 is folded into place, the bracket 3 is then folded, ultimately storing the bracket 3 and the snap-fit rod 2 on the top surface of the bottom frame 1, significantly reducing the height occupied by the trailer frame.

Furthermore, the folded state includes the stored state. In the stored state, the bracket 3 and/or the snap-fit rod 2 correspondingly abut against the top surface of the bottom frame 1. The stored state is the state after the trailer frame is fully folded. In this state, the bracket 3 and/or the snap-fit rod 2 correspondingly abut against the top surface of the bottom frame 1, flipping the bracket 3 and/or the snap-fit rod 2 to the stored extreme position, further reducing the height occupied by the trailer frame.

Figure 2:
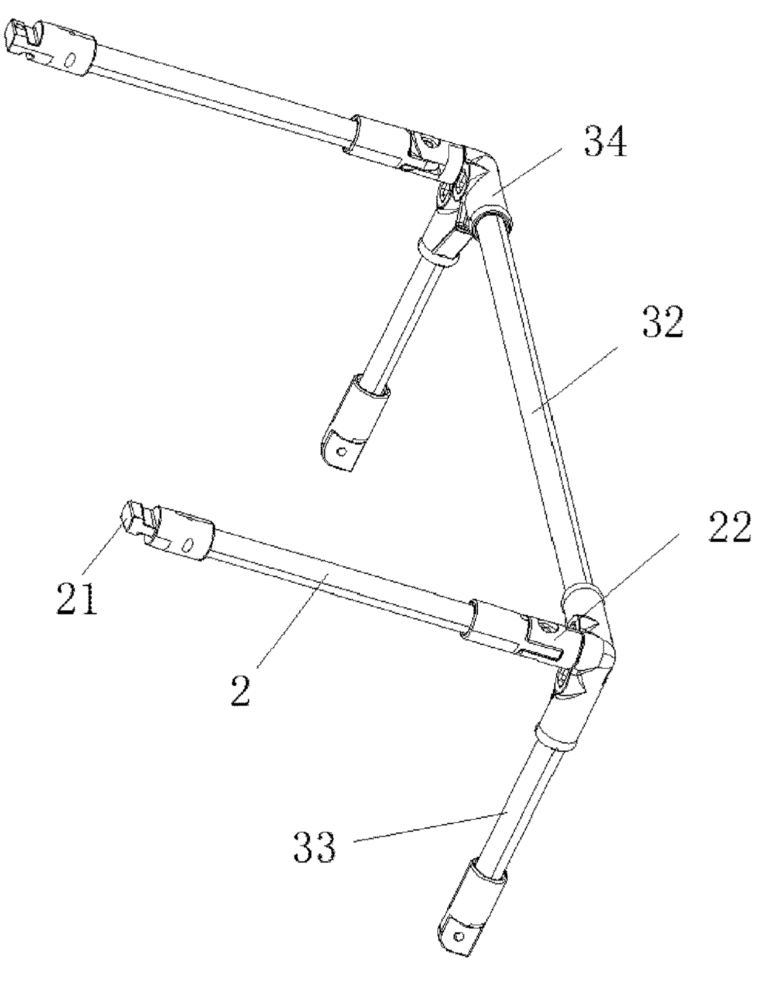
FIG. 2 is a schematic diagram showing the connection between a bracket and a pair of snap-fit rods according to the present invention.
Figure 3:
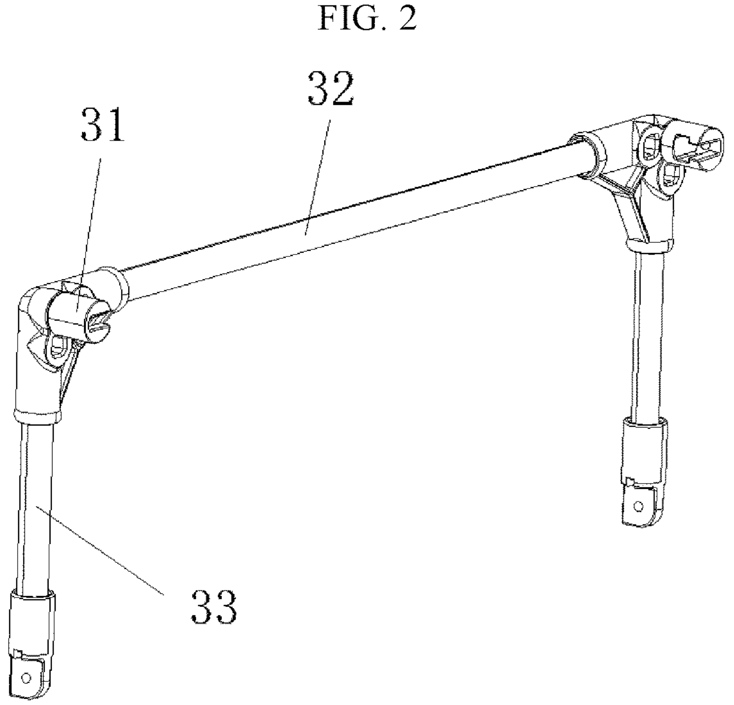
FIG. 3 is a schematic diagram showing the connection between the bracket and a pair of snap-fit cylinders according to the present invention.

As shown in FIGS. 2-3, the bracket 3 is constructed as a U-shaped bracket. The hinged end of the snap-fit rod 2 is hinged to a corner of the bracket 3 on the identical side. The snap-fit end of the snap-fit rod 2 engages with or disengages from a corner of the bracket 3 on the opposite side. The snap-fit end of the snap-fit rod 2 can also flip toward the plane where the bracket 3 is located. Specifically, when engaging, the snap-fit rod 2 supports the inner sides of the pair of brackets 3 to ensure the connection strength of the three and prevent the brackets 3 from flipping toward the inner side of the top surface of the bottom frame 1 in the use state. After disengaging, the snap-fit end of the snap-fit rod 2 is flipped toward the plane where the bracket 3 is located. The snap-fit rod 2 can be flipped toward the auxiliary bracket 33, toward the main bracket 32, or toward the inner side of the main bracket 32 and the auxiliary bracket 33, as long as it can ensure the detachable connection between the snap-fit rod 2 and the bracket 3 on the opposite side and the small space occupied by the snap-fit rod 2 after being folded and stored.

Figure 4:
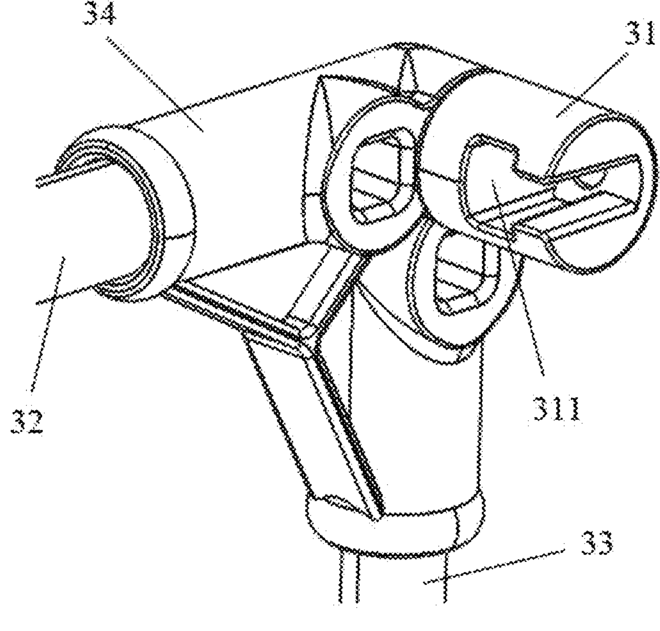
FIG. 4 is a schematic diagram showing the connection between the dual-passage sleeve and the snap-fit cylinders according to the present invention.

Referring to FIG. 4, the snap-fit end of the snap-fit rod 2 is constructed as the clamping block 21. The corner of the bracket 3 is provided with the snap-fit cylinder 31. The snap-fit cylinder 31 is correspondingly provided with the clamping block slot 311. The clamping block 21 can rotate around the hinge point of the snap-fit rod 2 to engage with or disengage from the clamping block slot 311. Specifically, by rotating around the hinge point of the snap-fit rod 2, the clamping block 21 engages with the clamping block slot 311 or the snap-fit rod 2 is folded and stored. Operation is simple and quick, requiring only the rotation of the snap-fit rod 2. In this embodiment, the clamping block 21 rotates around the hinge point of the snap-fit rod 2 to engage with the clamping block slot 311, which is specifically achieved through an interference fit between the clamping block 21 and the clamping block slot 311 in the axial direction of the snap-fit rod 2 to achieve the engagement of the two.

Optionally, the clamping block 21 and the clamping block slot 311 are correspondingly constructed as the T-shaped clamping block and the T-shaped clamping block slot. On one hand, the T-shaped snap-fit structure can play a guide role to guide the T-shaped clamping block into the T-shaped clamping block slot. On the other hand, it effectively enhances the connection strength between the clamping block 21 and the clamping block slot 311, thereby preventing them from disengaging during the use state and improving the reliability of the engagement of the clamping block 21 and the clamping block slot 311.

Furthermore, the bracket 3 includes the main bracket 32, a pair of auxiliary brackets 33, and a pair of dual-passage sleeves 34. The pair of dual-passage sleeves 34 are provided at two corners of the bracket 3 in one-to-one correspondence. The main bracket 32 and the auxiliary brackets 33 are connected through the dual-passage sleeves 34. The main bracket 32 and the pair of auxiliary brackets 33 are connected into a whole through the pair of dual-passage sleeves 34 to flip, which improves the convenience of operation of the bracket 3. In this embodiment, the dual-passage sleeve 34 is L-shaped. After being correspondingly inserted on the main bracket 32 and the auxiliary bracket 33, it is fixed with a screw. An angle between the main bracket 32 and the auxiliary bracket 33 is constructed as a right angle, and is arranged corresponding to the top surface of the bottom frame 1, so that the bracket 3 does not protrude from the top surface of the bottom frame 1 in the stored state, thus ensuring that the bracket 3 is stored on the inner side of the top surface of the bottom frame 1.

Figure 5:
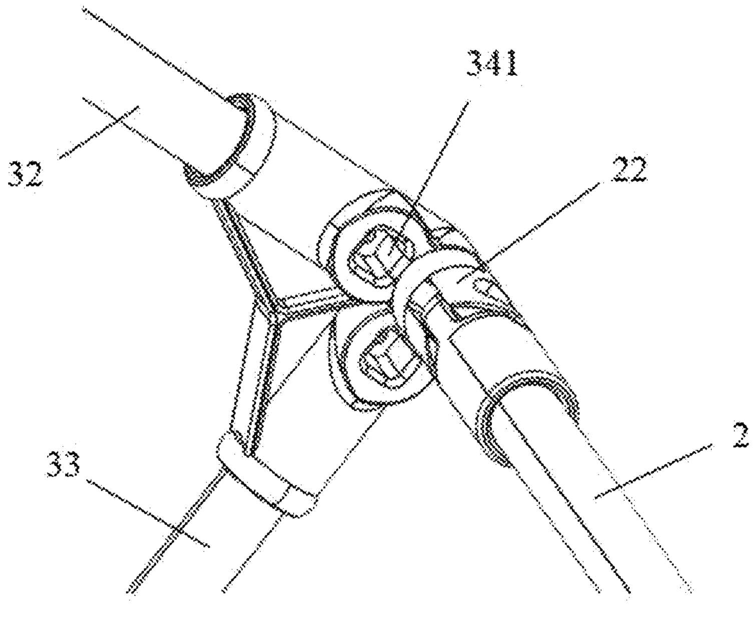
FIG. 5 is a schematic diagram showing the connection between a dual-passage sleeve and a hinge cylinder according to the present invention.
Figure 6:
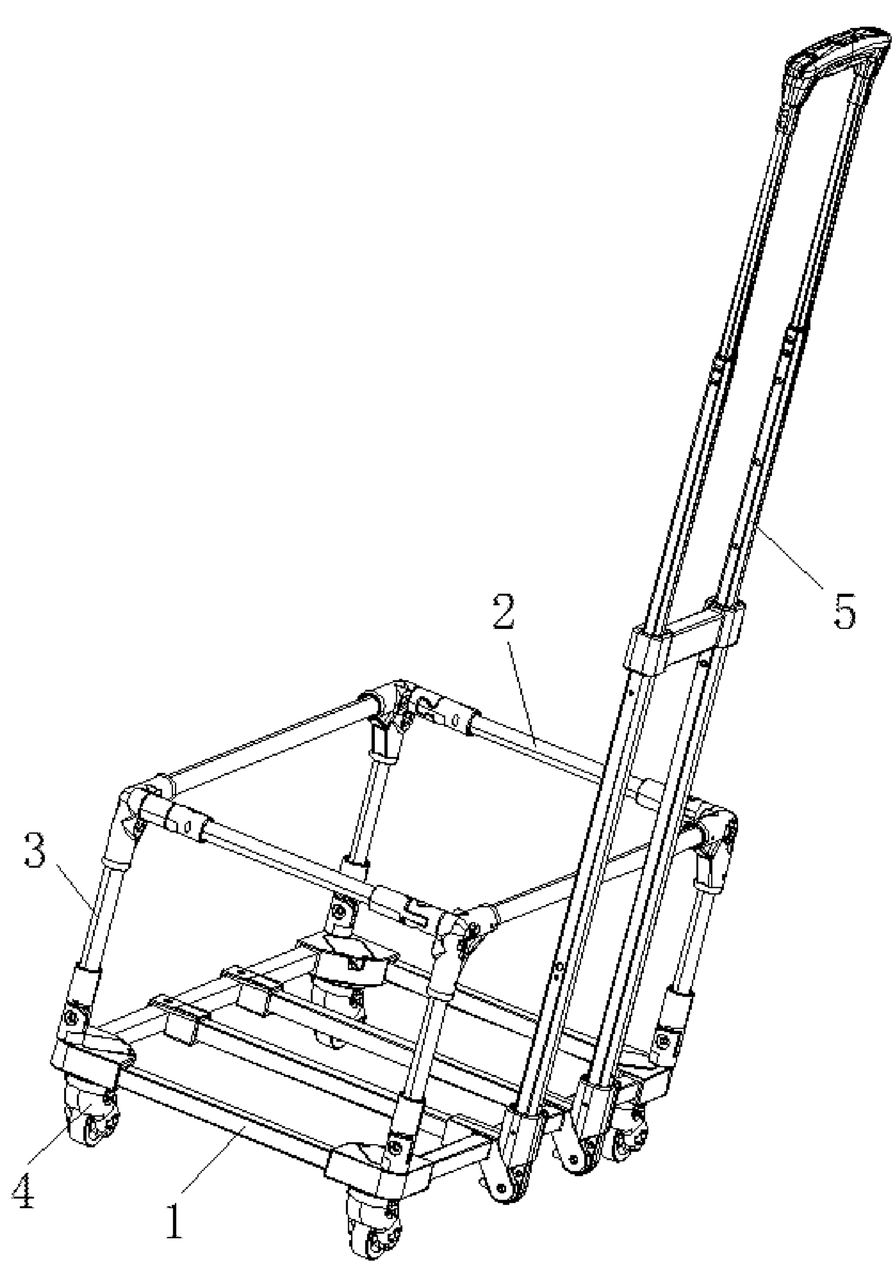
FIG. 6 is a perspective view of a folding trailer after a cover plate is removed according to the present invention.

As shown in FIG. 5, the hinged end of the snap-fit rod 2 is hinged to the hinge cylinder 22. The dual-passage sleeve 34 is provided with a plurality of connecting cylinders 341. The connecting cylinder 341 is correspondingly detachably connected to the snap-fit cylinder 31 or the hinge cylinder 22. In this embodiment, the connecting cylinder 341 is a through hole formed in the dual-passage sleeve 34. One end of the hinge cylinder 22 is provided with an insertion rod, and the insertion rod is inserted into the through hole and then fixed with a screw. Specifically, the screw is inserted into the through hole from the side away from the insertion rod and then threadedly engaged with the threaded hole formed in the insertion rod. The detachable connection method of the hinge cylinder 22 and the connecting cylinder 341 is similar and will not be described again. By forming the plurality of connecting cylinders 341 in the dual-passage sleeve 34, the snap-fit cylinder 31 and the hinge cylinder 22 can be flexibly disassembled or assembled, thereby adjusting the mounting position of the snap-fit rod 2 on the bracket 3, and thus adjusting the volume of the storage space to flexibly adapt to the placement of objects of different volumes on the trailer frame.

Secondly, the snap-fit cylinder 31 and/or the hinge cylinder 22 can abut against the top surface of the bracket 3. When the snap-fit cylinder 31 is located at the corner of the bracket 3, in the stored state, the snap-fit cylinder 31 abuts against the top surface of the bottom frame 1, causing the bracket 3 to rotate to the extreme position. In this state, the overall posture of the bracket 3 is tilted upward. Optionally, in the stored state, the snap-fit cylinder 31 abuts against the beam on the bottom frame 1, which effectively prevents the main bracket 32 and the auxiliary bracket 33 from being squeezed under an external pressure, thereby effectively protecting the bracket structure.

Furthermore, the bracket 3 is hinged to the top surface of the bottom frame 1. The sum of the height sizes of the pair of brackets 3 is not greater than the distance between the second hinge cylinders 11 on the identical sides of the pair of brackets 3. Based on the different hinge heights of the auxiliary brackets 33 on the top surface of the bottom frame 1, the posture of the brackets 3 in the stored state is also different. Specifically, the corner of the top surface of the bottom frame 1 is provided with the second hinge cylinder 11. The positions of the hinge rods on the second hinge cylinders 11 with different models are at different heights, therefore the hinge heights of the auxiliary brackets 33 on the top surface of the bottom frame 1 are also different. In this embodiment, by reasonably setting the heights of the hinge rods of the second hinge cylinders 11 and the height sizes of the brackets 3 in the use state, the sum of the height sizes of the pair of brackets 3 is not greater than the distance between the hinge points on the identical sides of the pair of brackets 3, thereby ensuring that the pair of brackets 3 will not collide in the flipping process of the pair of brackets 3, effectively protecting the brackets 3. Of course, in other embodiments, the pair of brackets 3 can be stacked crosswise on the top surface of the bottom frame 1. Furthermore, based on the different setting heights of the second hinge cylinders 11, in the stored state, the overall posture of the brackets 3 is tilted upward, horizontal, or tilted downward.

Figure 7:
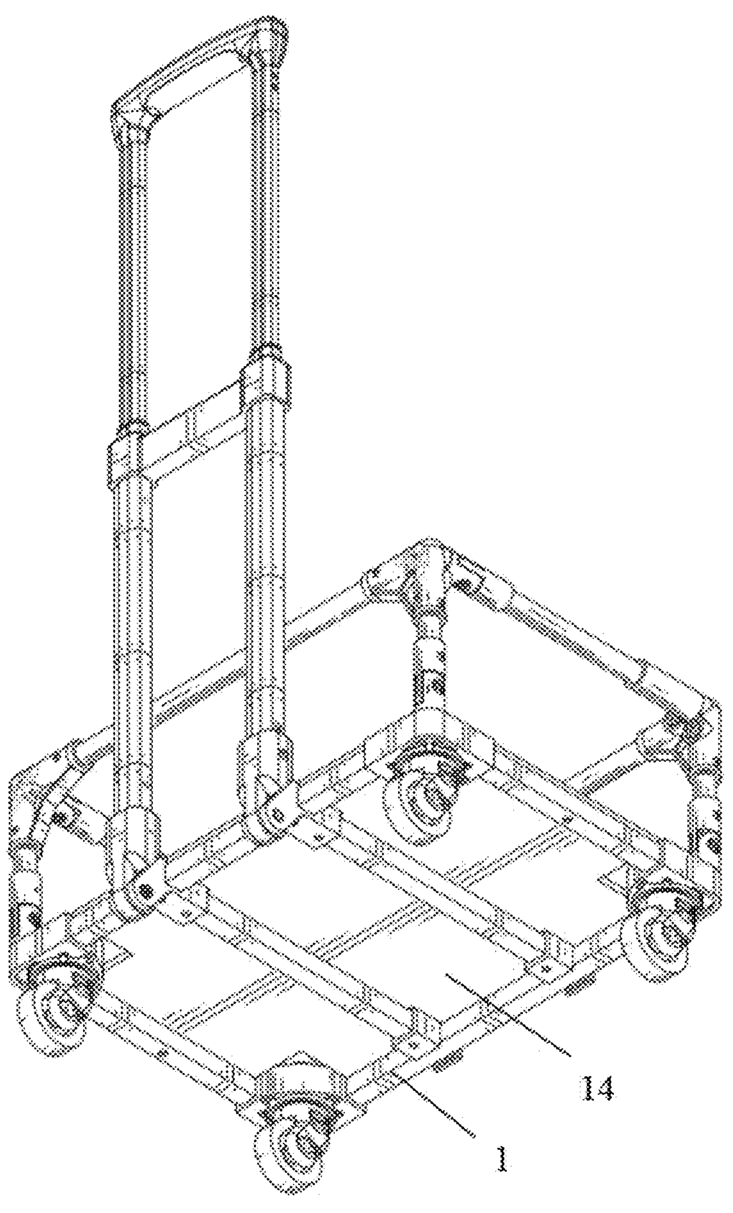
FIG. 7 is a structural schematic diagram of the folding trailer in a first use state according to the present invention.
Figure 8:
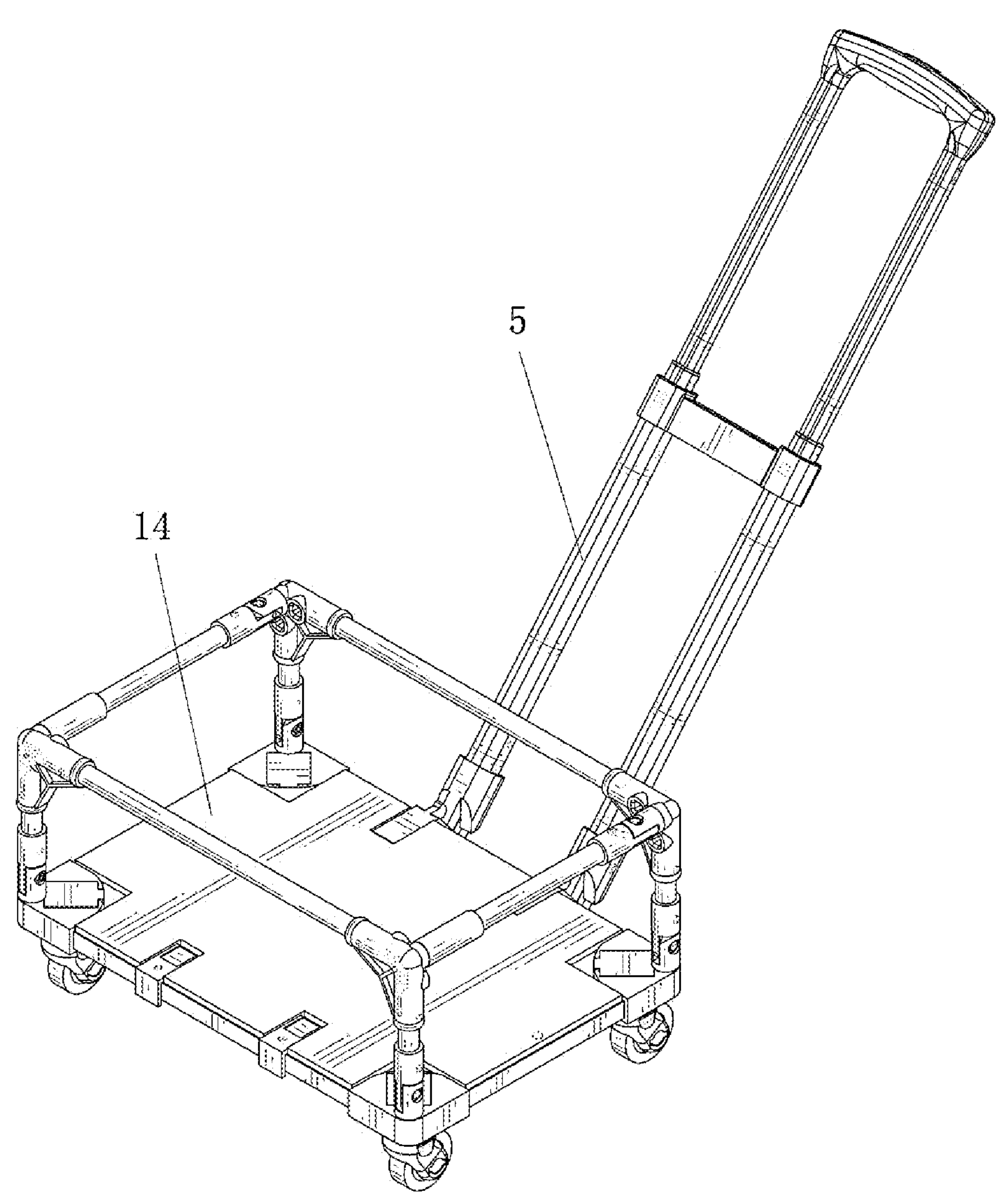
FIG. 8 is a structural schematic diagram of the folding trailer in a second use state according to the present invention.

Furthermore, the bottom frame 1 includes a support frame. The top surface of the support frame is constructed as a support surface. The support surface, the pair of brackets 3, and a pair of snap-fit rods 2 enclose the cuboid frame. Specifically, the support frame is formed by connecting a plurality of beams. First, a plurality of beams are connected to form a square frame, and then a plurality of beams are arranged in parallel on the inner side of the support frame to partition the hollow inside the support frame and provide the reliable support surface. Optionally, referring to FIG. 7, the top surface of the bottom frame 1 is provided with the cover plate 14. The area of the cover plate 14 covers the hollow part on the top surface of the bottom frame 1. The cover plate 14 is fixed to the beams of the bottom frame 1 by screws, that is, the top surface of the cover plate 14 is the support surface, and objects can be placed on the cover plate 14, which improves the stability of the placement of objects on the top surface of the bottom frame 1. Furthermore, the support surface, the pair of brackets 3, and the pair of snap-fit rods 2 can enclose the cuboid frame. The cuboid frame has the regular shape and high adaptability to objects with regular shapes. Moreover, folding and storing the trailer frame is simpler, more intuitive, and less prone to errors.

Optionally, at least one pair of universal wheels 4 are detachably provided at the bottom of the bottom frame 1. In this embodiment, four corners of the bottom of the bottom frame 1 are correspondingly provided with four universal wheels 4. In other embodiments, one side of the bottom of the bottom frame 1 is provided with a pair of universal wheels 4 to guide the pushing and pulling direction. The other side of the bottom of the bottom frame 1 is provided with a pair of fixed wheels, and the pair of fixed wheels performs follow-up movement. Both the universal wheels 4 and the fixed wheels are detachably connected to the bottom of the bottom frame 1. This detachable connection can be achieved using screws or elastic fasteners. This allows the universal wheels 4 and the fixed wheels to be detached from the trailer frame when the available height size of the storage space is small, significantly reducing the space occupied by the trailer frame, thus reducing the space occupied by the trailer frame. This improves the trailer frame's stored adaptability to a small storage space and makes it easier to fit into a car trunk, a cabinet, or a suitcase, which is especially convenient for pet owners who travel frequently (e.g., when transporting pets by high-speed rail or airplane).

Optionally, the detachable structure of the universal wheel 4 is connected by means of a pin and a latch. The top of the universal wheel 4 is provided with the pin, and the insertion rod is inserted into and cooperates with the insertion hole at the bottom of the bottom frame 1 to position and mount the universal wheel 4. The universal wheel 4 can rotate 360° relative to the bottom frame 1. The bottom of the bottom frame 1 is provided with a pair of elastic fasteners, and the universal wheel 4 is correspondingly provided with the pair of latching slots. The pair of elastic fasteners engage with the pair of latching slots in one-to-one correspondence to form a latch structure, thereby achieving the detachable connection between the universal wheel 4 and the bottom frame 1, which facilitates assembly and disassembly. When the wheels are stained with mud, they can be individually detached and washed or replaced. If one of the wheels is damaged (e.g., the bearing is stuck), only the wheel needs to be replaced without scrapping the entire combined trailer, thus improving product lifespan and environmental friendliness.

Furthermore, the present invention further provides a combined trailer, and the combined trailer includes the above-mentioned trailer frame. Referring to FIGS. 6-9, the combined trailer further includes a pet carrier bag. The bottom frame 1, the snap-fit rod 2, and the pair of brackets 3 cover the outer side of the pet carrier bag. Specifically, the bottom frame 1, the pair of brackets 3, and the pair of snap-fit rods 2 can enclose the cuboid frame, and the pet carrier bag is placed inside the cuboid frame. The inner side surface and the bottom surface of the cuboid frame, i.e., the top surface of the bottom frame 1, correspond to and cooperate with the pet carrier bag to limit the position of the pet carrier bag. Of course, the pet carrier bag can extend out of the storage space enclosed by the cuboid frame through the hollow position of the cuboid frame. The combined trailer is not limited to the combination of the trailer frame and the pet carrier bag. The pet carrier bag may also be replaced with a box, a cage, or a bag, etc. The advantage of using the cuboid frame structure for transporting a pet carrier bag in the combined trailer is that the cuboid frame has fewer limiting structures, that is, the cuboid frame has a large hollow area, making it highly adaptable to the placement of irregularly shaped pet carrier bags. The cuboid frame is easily folded and stored, occupying a small space after being stored.

Currently, there are various portable pet transport vehicles with wheels available on the market for transporting pets on airplanes or car trips. The pet transport vehicle includes a base (i.e., bottom frame), a soft-covered pet carrier bag, and hook and loop fasteners. The soft-covered pet carrier bag, made of fabric material, is used to carry a pet. The bottom of the soft-covered pet carrier bag is provided with a plurality of hook and loop fasteners, typically on the up, down, left, and right positions of the bottom of the soft-covered pet carrier bag. The metal or aluminum base with wheels is used to mount and transport the pet carrier bag, and the top surface of the base is correspondingly provided with a plurality of hook and loop fasteners, allowing for the detachable connection between the soft-covered pet carrier bag and the top surface of the pet transport vehicle. However, the detachable connection between the base and the soft-covered pet carrier bag using a pair of hook and loop fasteners has the following drawbacks:

1. When taking an airplane, due to the height restrictions of airline seats, the pet carrier bag needs to be detached from the base and tucked under the seat. When getting off the airplane, the pet carrier bag needs to be fastened back to the base using the hook and loop fasteners, which is cumbersome. Because the hook and loop fasteners are located at the bottom of the pet carrier bag, the position of the hook and loop fasteners is not fully visible. When the pet is inside the pet carrier bag, due to the pet's weight, it is difficult to remove and fix the hook and loop fasteners. The same reason applies to other application scenarios that require frequent assembly and disassembly of the base and the pet carrier bag, resulting in cumbersome operations and poor user experience.

2. When the pet is inside the pet carrier bag, the noise and vibration generated by removing the hook and loop fasteners may disturb the pet, increasing the difficulty of assembling and disassembling the pet carrier bag.

3. Pet carrier bags and bases on the current market vary in size and specifications across different brands. When the pet carrier bag becomes old or damaged and needs replacement, it is often necessary to purchase the matching pet carrier bag and base from the same brand to adapt the mounting position of the hook and loop fasteners on the base. Some household pet carrier bags of similar size without the hook and loop fasteners are difficult to be fixed to the base, posing the risk of detaching from the base during transport.

4. After washing the pet carrier bag and repeated removal of the hook and loop fasteners, the stickiness of the hook and loop fasteners will gradually weaken until it can no longer adhere firmly, affecting the lifespan of the pet transport vehicle.

Based on this, in the present invention, the cuboid frame is constructed in the combined trailer to enclose the storage space, and the pet carrier bag is placed in the storage space. Firstly, the pet carrier bag can be transported simply by placing it in the storage space. The pet carrier bag does not require the hook and loop fasteners or straps to be fixed to the bottom frame 1, preventing scratching the hands during mounting. Secondly, the snap-fit rods 2 and the brackets 3 in the use state function as a fence. The fence structure is easy to assembly and disassembly. The brackets 3 only need to be flipped, and the snap-fit rods 2 also only need to be flipped (the engagement is completed simultaneously in the flipping process), allowing for easy assembly and disassembly. Thirdly, when the combined trailer is not in use, the fence can be folded for easy storage with a small, occupied space. Fourthly, there are fewer limitations on the size of the pet carrier bag because the fence structure above the bottom frame 1 allows any pet carrier bag of suitable size to be placed inside the fence, eliminating the need to purchase the matching pet carrier bag for the bottom frame 1. The fence plays limiting and protection roles for the pet carrier bag, preventing the pet carrier bag from easily falling and enhancing practicality.

Furthermore, the combined trailer further includes the folding armrest 5. The folding armrest 5 is mounted on the bottom frame 1. The folding armrest 5 can rotate from the vertically upward posture to the bottom of the bottom frame 1. In this embodiment, the folding armrest 5 is a multi-stage telescopic armrest, allowing for flexible adjustment of the overall usable length of the folding armrest 5. The folding armrest 5 includes a first extreme position and a second extreme position. The first extreme position corresponds to the use state, and in this state, the length direction of the folding armrest 5 is perpendicular to the top surface of the bottom frame 1. The second extreme position corresponds to the stored state, and in this state, the folding armrest 5 needs to rotate approximately 270° from the first extreme position until the armrest 5 abuts (or nearly abuts) against the bottom of the bottom frame 1, thus storing the folding armrest 5 into the bottom of the bottom frame 1, significantly reducing the height occupied by the folding armrest 5.

In actual operation, in order to fold and store the combined trailer, the snap-fit rod 2 is first disengaged from the corner of the bracket 3 on the opposite side, and is then flipped to the other corner of the identical bracket 3 until the snap-fit end of the snap-fit rod 2 touches the bracket 3, thus completing the folding of the snap-fit rod 2. When the pair of snap-fit rods 2 are hinged on the identical bracket 3, the snap-fit rod 2 that is flipped later is rotated until it touches the snap-fit rod 2 that is flipped earlier.

The bracket 3 is flipped toward the inner side of the top surface of the bottom frame 1 until the snap-fit cylinder 31 or the hinge cylinder 22 touches the top surface of the bottom frame 1, thus completing the folding of the bracket 3.

The folding armrest 5 is rotated from the vertically upward posture to the bottom of the bottom frame 1, thus completing the folding and storing of the folding armrest 5.

The above operational method allows for the folding and storing of the trailer frame, which significantly reduces the space occupied by the trailer frame and facilitates storing the trailer frame under a seat or in other small spaces. When the trailer frame is needed, the steps are simply reversed to quickly assemble the cuboid frame for using, improving the user experience.

Referring to FIGS. 10-18, the folding armrest 5 includes the armrest 51, the snap-fit component 52, and the adapter 53. One end of the snap-fit component 52 is connected to the armrest 51, and the other end of the snap-fit component 52 is hinged to the adapter 53. The adapter 53 has a rotational space in which the snap-fit component 52 rotates, and the limiting corner 5313 is provided within the rotational space. The snap-fit component 52 is provided with the clamping strip 521 corresponding to the limiting corner 5313. During the rotation of the snap-fit component 52 around its hinge point, the following sequence occurs: the clamping strip 521 abuts against and is limited by the limiting corner 5313, and the armrest 51 is in a suspended position. The clamping strip 521 slides against the limiting corner 5313 and passes over its apex, that is, the clamping strip 521 slides on the limiting corner 5313 in the interference fit, causing the armrest 51 to enter the folded state.

The adapter 53 includes the adapter block 531 and the ear plate 532 that are connected in a V-shaped configuration. The adapter block 531 is provided with the latch 533. The snap-fit component 52 is provided with the clamping slot 522. The clamping slot 522 can engage with or disengage from the latch 533. The joint between the side plate 5311 and the bottom plate 5312 of the adapter block 531 is the limiting corner 5313. The snap-fit component 52 is provided with the clamping strip 521 that is synchronized with the rotational angle of the armrest 51. When the snap-fit component 52 rotates around the hinge point, the clamping strip 521 can abut against one limiting surface of the limiting corner 5313, and can also rotate to the other limiting surface of the limiting corner 5313 by the interference fit.

In the rotational direction of the snap-fit component 52 around its hinge point, the rotational space is constructed by the side plate 5311, the bottom plate 5312 and the limiting corner 5313 of the adapter block 531 and the pair of ear plates 532. In this embodiment, the snap-fit component 52 can rotate at least 270° within the rotational space.

During a single unidirectional rotation of the snap-fit component 52, the clamping strip 521 can cooperate with one of the two limiting surfaces of the limiting corner 5313. Specifically, taking FIG. 11 as an example, with the horizontal plane, i.e., the top surface of the adapter 53, as a reference plane, when the snap-fit component 52 rotates clockwise to 45°, the clamping strip 521 abuts against a part of the limiting corner 5313 near the bottom plate 5312, achieving the 45° suspension of the armrest 51. When the armrest 51 needs to be folded, the downward pressure on the armrest 51 is increased, so that the clamping strip 521 slides along the limiting corner 5313 through the interference fit until the clamping strip 521 disengages from the limiting corner 5313. Then, the armrest 51 is continually rotated clockwise until the armrest 51 is folded and stored under the bottom plate 5312.

When the armrest 51 needs to be reused, the armrest 51 is rotated counterclockwise until the clamping strip 521 abuts against a part of the limiting corner 5313 near the side plate 5311. Then, the upward pulling force on the armrest 51 is further increased, so that the clamping strip 521 slides along the limiting corner 5313 through the interference fit until the clamping strip 521 disengages from the limiting corner 5313. Then, the armrest 51 is continually rotated counterclockwise until the snap-fit component 52 engages with the adapter 53.

The armrest 51 is mounted on the bottom frame of the folding trailer via the snap-fit component 52 and the adapter 53, allowing the bottom frame 1 to be manually transported by gripping the armrest. Optionally, the armrest 51 is the multi-stage telescopic armrest to improve the convenience of manual transport. The hinged structure of the snap-fit component 52 and the adapter 53 allows the armrest 51 to rotate relative to the bottom frame 1, enabling the folding and storing of the armrest 51. The whole of the adapter 53 is V-shaped, with the adapter block 531 horizontally connected to the bottom frame, while the ear plate 532 is tilted downwards, providing a mounting space and a rotational space for the hinged structure of the snap-fit component 52.

The clamping slot 522 can engage with the latch 533, and in this case, the adapter block 531 is perpendicular to the snap-fit component 52 (i.e., the armrest 51), facilitating manual gripping of the armrest 51 to push or pull the bottom frame. After the clamping slot 522 disengages from the latch 533, the snap-fit component 52 can rotate around its hinge point to under the bottom plate 5312 of the adapter block 531, achieving folding and storing of the armrest 51. Even without the clamping slot 522 and the latch 533 in the present invention, the folding armrest 5 can still be used normally, although it is not convenient to push or pull the armrest 51 at the 90° angle. However, the suspension mechanism of the folding armrest 5 allows the armrest 5 to suspend at the 45° angle after the user removes their hand from the armrest 51, improving use convenience of the armrest 5. Of course, the actual suspension angle can be adjusted according to use requirements by setting the sizes and positions of the clamping strip 521 and the limiting corner 5313.

The clamping strip 521 cooperates with the limiting corner 5313. In the rotation direction of the snap-fit component 52 around its hinge point, when the force applied manually to the armrest 51 is less than the preset deformation force of the clamping strip 521, that is, less than the force required for the clamping strip 521 to pass over the limiting corner 5313, the clamping strip 521 can be regarded as the rigid member that does not deform. At this time, one of the two limiting surfaces of the limiting corner 5313 can limit the rotational angle of the clamping strip 521. Taking the angle between the top surface of the adapter block 531 and the length direction of the armrest 51 as an example, the limiting component with the suspension angle between 90° and 180° is constructed for the armrest 51. Even if the armrest 51 can be fixed at the preset angle between 90° and 180°, the suspension angle in this embodiment is 135°, that is, the angle between the length direction of the armrest 51 and the horizontal plane is 45°. It should be noted that the limiting surface is not limited to a part of the corner surface of the limiting corner 5313, but can also extend slightly to the side plate 5311 or bottom plate 5312 of the adapter block 531 to ensure the limiting effect on the rotational angle of the clamping strip 521.

Figure 11:
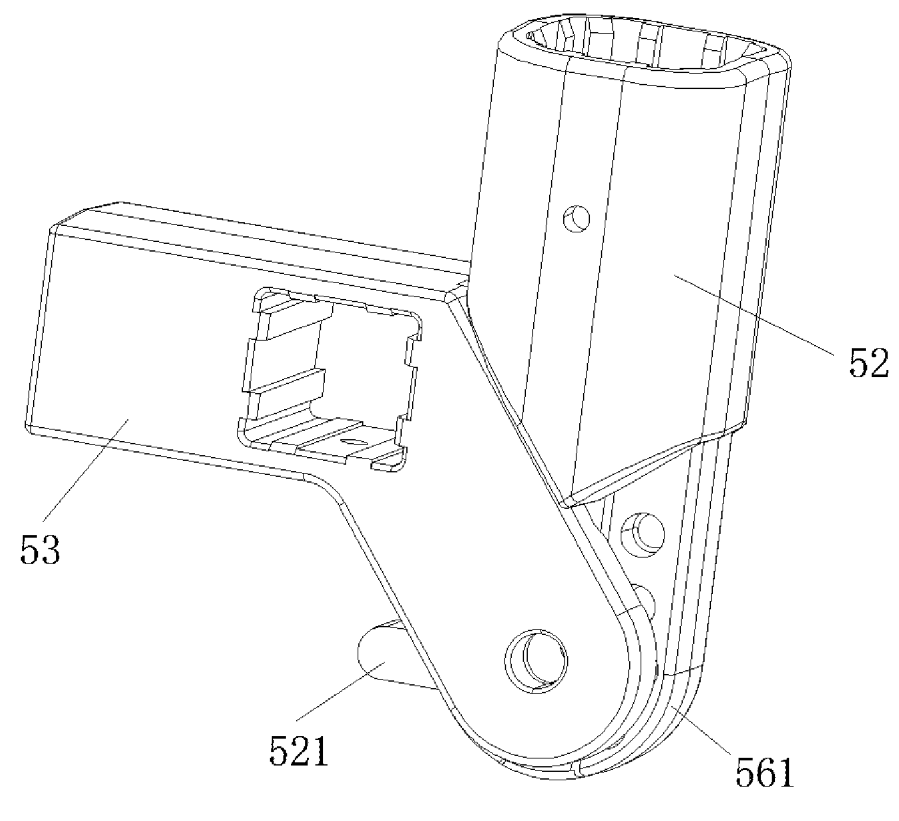
FIG. 11 is a schematic diagram showing the connection between a snap-fit component and an adapter in the first use state according to the present invention.
Figure 12:
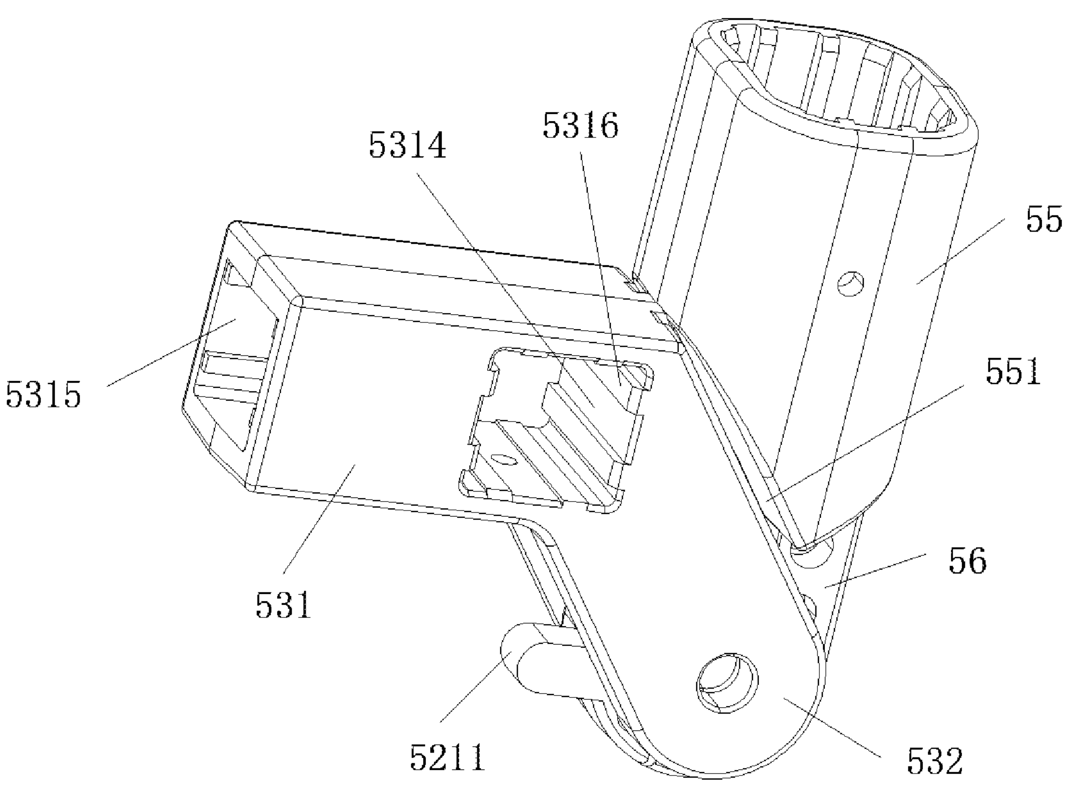
FIG. 12 is a structural schematic diagram of the folding armrest from a side perspective according to the present invention.
Figure 13:
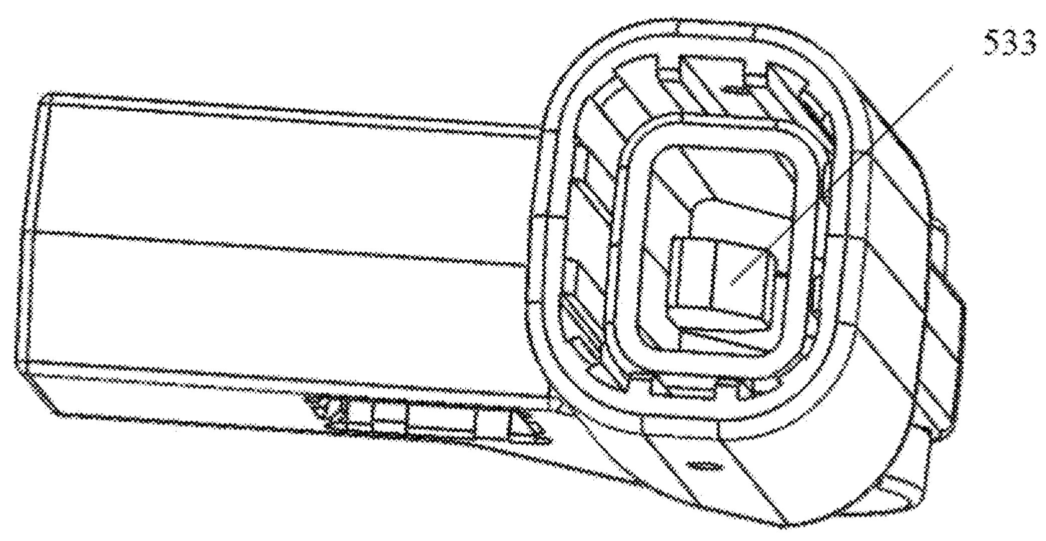
FIG. 13 is a structural schematic diagram of the folding armrest from a top perspective after the armrest is removed according to the present invention.
Figure 14:
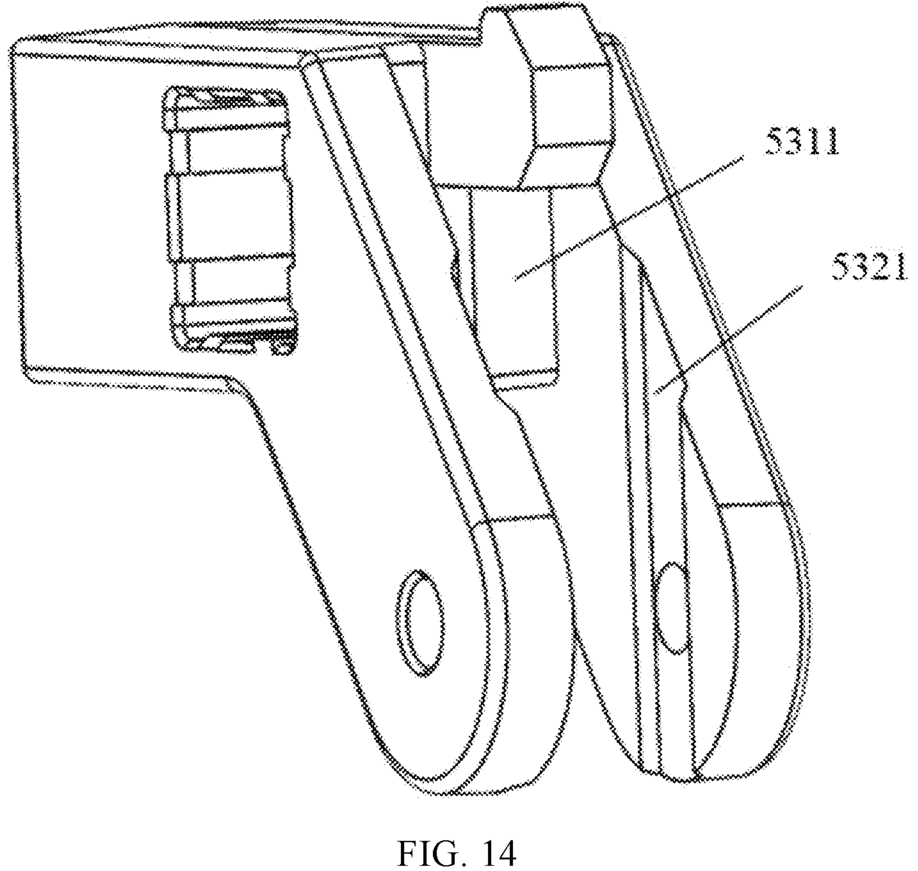
FIG. 14 is a structural schematic diagram of the adapter according to the present invention.
Figure 15:
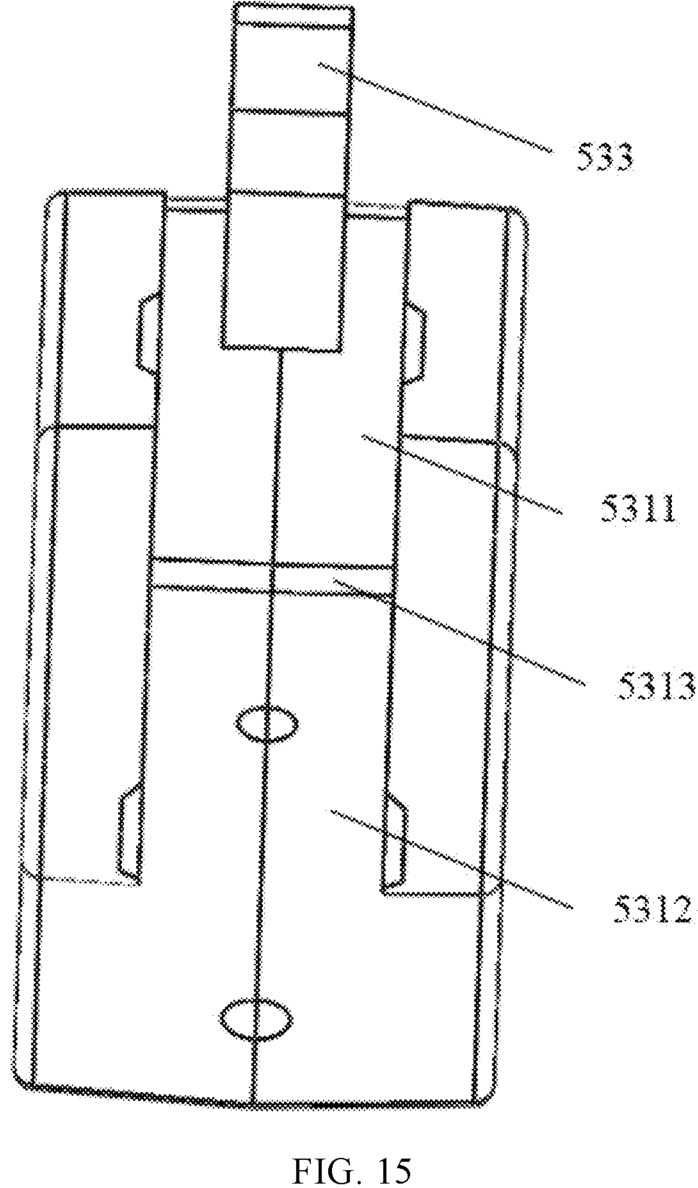
FIG. 15 is a structural schematic diagram of the bottom of the adapter according to the present invention.
Figure 16:
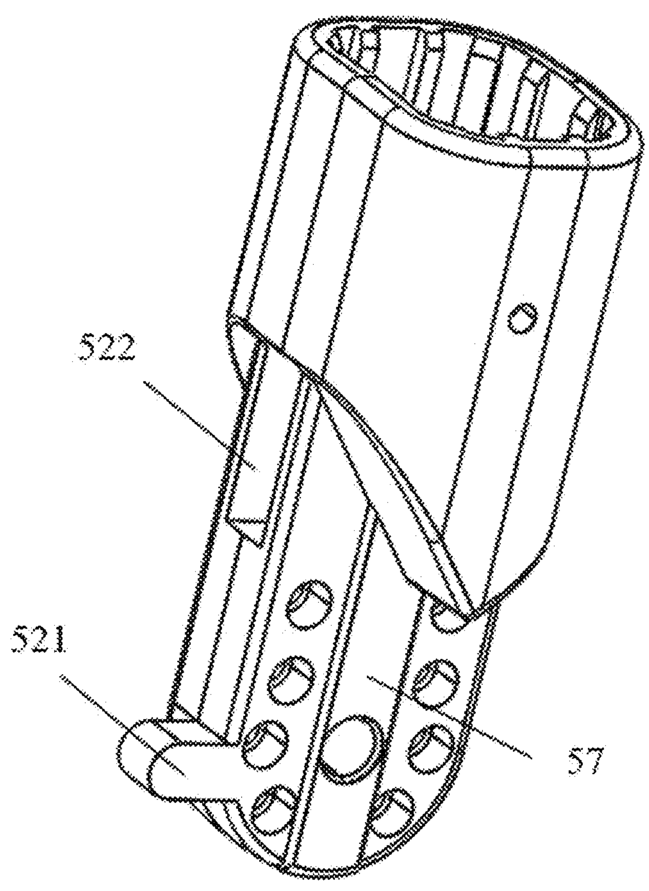
FIG. 16 is a structural schematic diagram of the snap-fit component according to the present invention.

Specifically, taking the orientation shown in FIG. 11 as an example, the angle between the top surface of the adapter 53 and the length direction of the snap-fit component 52 represents the angle between the length direction of the armrest 51 and the top surface of the bottom frame. When the snap-fit component 52 engages with the adapter 53, the angle between the two is 90°. After the snap-fit component 52 disengages from the adapter 53, the armrest 51 is rotated clockwise until the free end of the clamping strip 521 abuts against a part of the limiting corner 5313. At this point, the angle between the snap-fit component 52 and the adapter 53 is 135°. In this state, the bottom plate 5312 of the adapter block 531 can limit the clockwise rotation of the clamping strip 521, i.e., the snap-fit component 52, thus positioning the armrest 51 at the angle of 135°. This effectively avoids the need to engage the snap-fit component 52 with the adapter 53 or place the armrest 51 on the ground after the user removes their hand from the armrest 51. When it is necessary to drag the bottom frame 1 again, the armrest 51 is simply dragged directly. Alternatively, the armrest 51 can be lifted counterclockwise, so that the armrest 51 can dragged within the angle range of 900 to 135°, greatly improving the flexibility of using the folding armrest 5.

Figure 9:
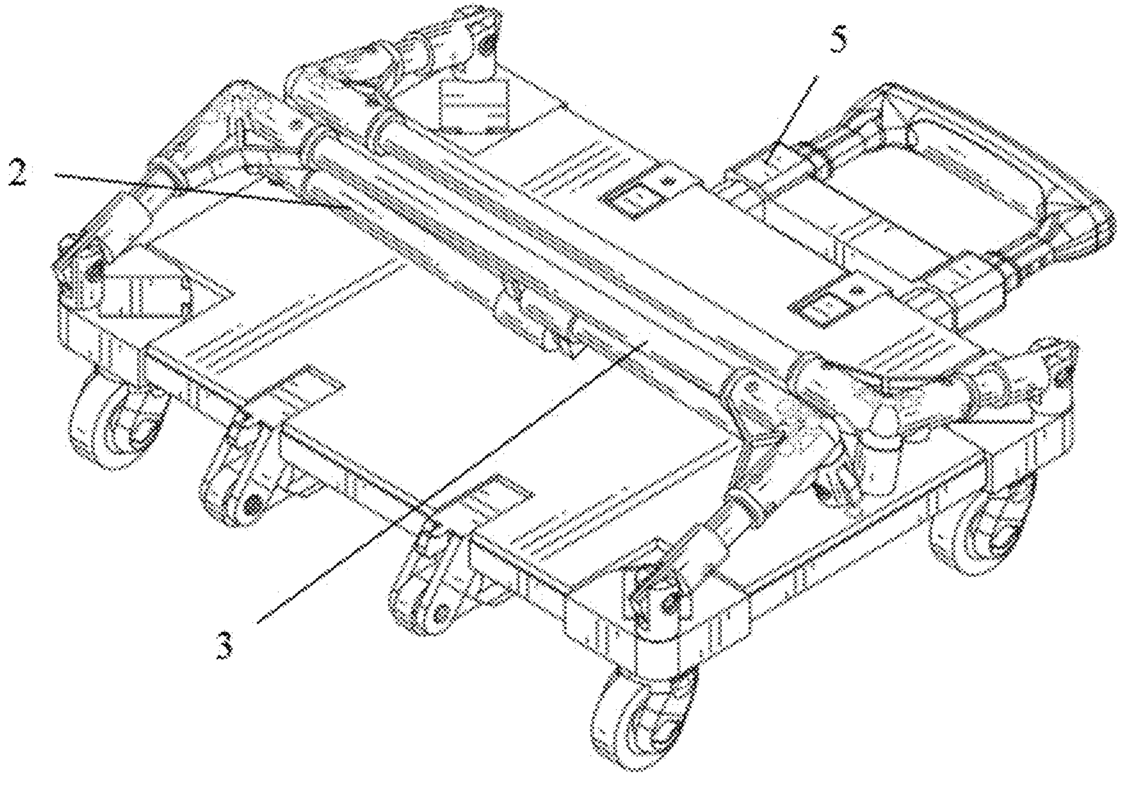
FIG. 9 is a structural schematic diagram of the folding trailer in a stored state according to the present invention.
Figure 10:
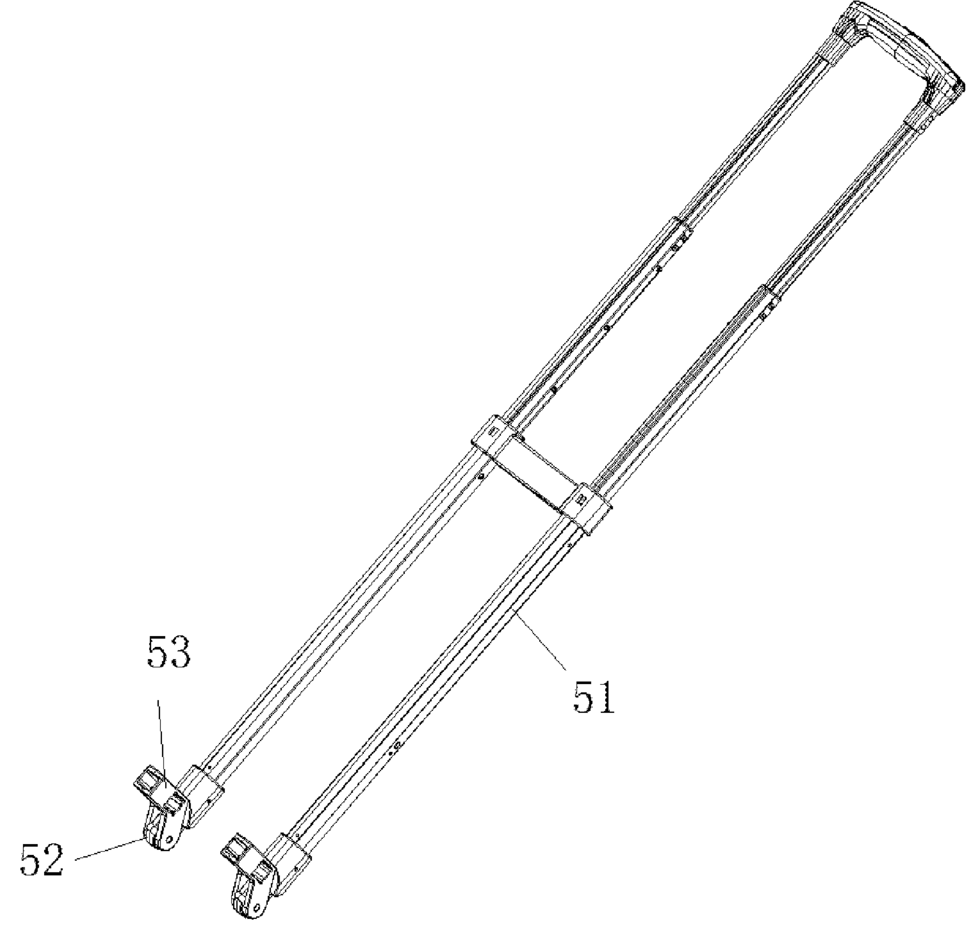
FIG. 10 is a perspective view of a folding armrest according to the present invention.
Figure 17:
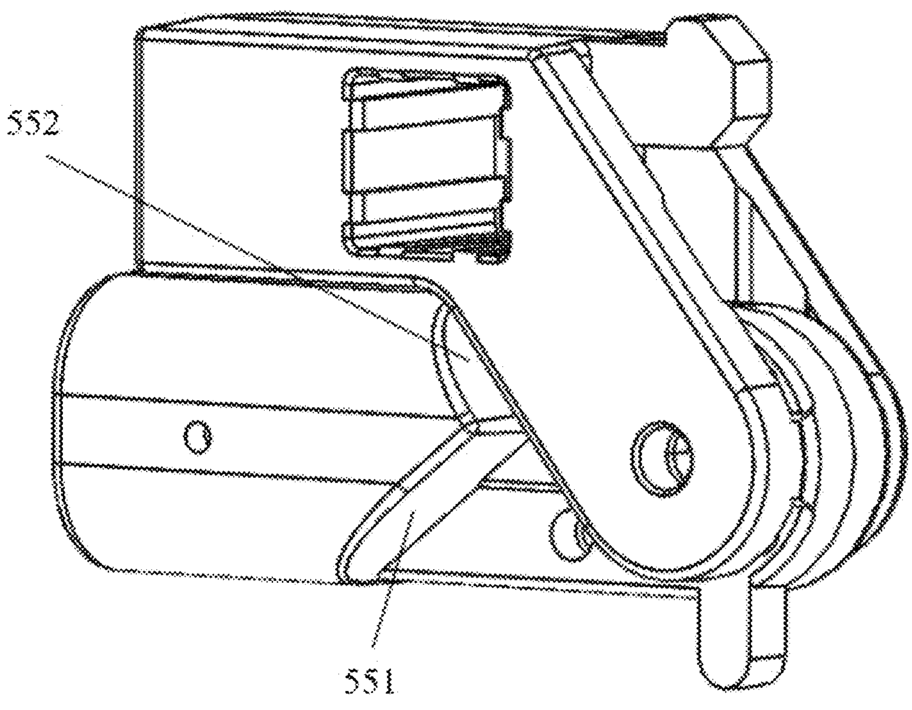
FIG. 17 is a schematic diagram showing the connection between the snap-fit component and the adapter in a third use state according to the present invention.
Figure 18:
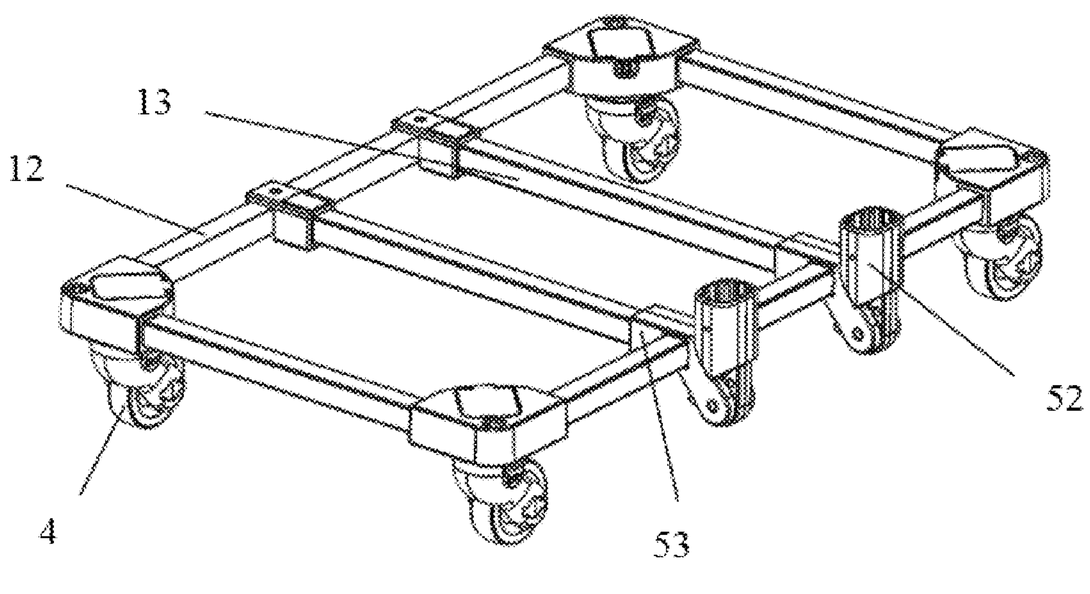
FIG. 18 is a schematic diagram showing the connection between the folding armrest and the bottom frame after the armrest is removed according to the present invention.

When the force applied manually to the armrest 51 exceeds the preset deformation force of the clamping strip 521, the clamping strip 521 can slide on the limiting corner 5313 through the interference fit, thereby weakening the limiting effect of the limiting corner 5313. This allows the clamping strip 521 to rotate clockwise and pass over the limiting corner 5313, thus rotating the armrest 51 to under the bottom plate 5312 of the adapter block 531, completing the folding and storing of the armrest 51. The folding and storing position is shown in FIG. 9 and FIG. 17.

Optionally, the clamping strip 521 may be a plastic component, capable of automatically resetting after a certain deformation, so that the clamping strip 521 can be considered an elastic component capable of deformation, thus shortening its size through elastic deformation. This weakens the limiting effect of the limiting corner 5313, allowing the clamping strip 521 to rotate to pass over the limiting corner 5313, which effectively reduces wear during the interference fit and sliding between the clamping strip 521 and the limiting corner 5313, and extends the service life of the clamping strip 521 and the limiting corner 5313.

In this embodiment, the armrest 51 can be folded and stored under the bottom plate 5312 without abutting against the bottom plate 5312. Optionally, the folding and storing position is the position where the armrest 51 abuts against the bottom of the bottom frame 1, or the position where the snip-fit component 52 abuts against the bottom plate 5312. Optionally, the mounting base or the hook and loop fasteners are provided at the bottom of the bottom frame 1 to cover and limit the free end of the armrest 51 at the folding and storing position, fixing the free end of the armrest 51 to the bottom of the bottom frame, further improving the convenience of storing the armrest 51.

When the armrest 51 needs to be used, the armrest 51 is rotated counterclockwise from the folding and storing position of the armrest 51 until the clamping strip 521 abuts against the side plate 5311 of the adapter block 531. Similarly, when the force applied manually to the armrest 51 exceeds the preset deformation force of the clamping strip 521, the clamping strip 521 can slide on the limiting corner 5313 through the interference fit, thereby weakening the limiting effect of the limiting corner 5313. This allows the clamping strip 521 to rotate counterclockwise and pass over the limiting corner 5313, so that the armrest 51 tilted at an angle of 90°-135° can be gripped manually for transporting, or the armrest 51 is transported after the snip-fit component 52 engages with the adapter 53.

Furthermore, the folding armrest 5 includes a first use state and a second use state. The rotational space includes a first preset angle and a second preset angle. In the first use state, the snap-fit component 52 engages with the adapter 53, and the adapter 53 is perpendicular to the armrest 51. The rotational angle of the snap-fit component 52 from engaging with the adapter 53 to disengaging from the adapter 53 is the first preset angle. In the second use state, the snap-fit component 52 disengages from the adapter 53, and the snap-fit component 52 can rotate around its hinge point until the clamping strip 521 abuts against and is limited by the limiting corner 5313, where the rotational angle of the snap-fit component 52 is the second preset angle. Specifically, the first use state and the second use state are the states when the folding armrest 5 is manually dragged to move. In the first use state, the armrest 51 is in the vertical state, allowing manual gripping of the armrest 51 for pushing or pulling. In the second use state, the armrest 51 is in a tilted state, allowing manual gripping of the armrest 51 for pushing or pulling. The first preset angle is the moving angle required for the snap-fit component 52 to disengage from the adapter 53, and the second preset angle is the adjustable push-pull angle in the second use state.

In this embodiment, the angle between the top surface of the adapter 53 and the length direction of the snap-fit component 52 is used as the reference angle. The first preset angle is 10°, corresponding to the range of 90°-100°. That is, when the snap-fit component 52 rotates counterclockwise to 100°, it is limited by the latch 533. From this limiting position until the two are fully engaged, the snap-fit component 52 needs to rotate counterclockwise by 10°. This mechanism effectively improves the engagement strength between the snap-fit component 52 and the adapter 53, ensuring that the two will not accidentally detach in the first use state. The second preset angle is 30°, corresponding to the range of 100°-130°. The armrest 51 can be gripped manually at the second preset angle for transporting, and the gripping angle is adjustable within the range of 100°-130°. Both the first use state and the second use state are the push-pull use states of the folding armrest 51, improving the flexibility of using the armrest 51 and making transport more effortless.

Secondly, the folding armrest 5 further includes a switching state. The rotational space further includes a third preset angle. In the switching state, the snap-fit component 52 can rotate around its hinge point, while the clamping strip 521 slides against the limiting corner 5313 through the interference fit. The rotational angle of the snap-fit component 52 from abutting to disengagement of the clamping strip 521 and the limiting corner 5313 is the third preset angle. In this embodiment, the switching state is used to switch between the second use state and the folded state during the process of the clamping strip 521 switching between the two limiting surfaces of the limiting corner 5313. The third preset angle is 10°, corresponding to the range of 130°-140°, that is, from the abutting position of the clamping strip 521 against one limiting surface of the limiting corner 5313 to the time when the clamping strip 521 slides on the limiting corner 5313 until the clamping strip 521 disengages from the limiting corner 5313, the required rotational angle is 10°. This mechanism reduces the possibility of the clamping strip 521 accidentally entering the switching state, ensuring the normal use of the second use state and the folded state in case of not manually entering the switching state, thus improving the reliability of using the folding armrest 5 in all states.

In addition, the folding armrest 5 further includes a stored state. The rotational space further includes a fourth preset angle. In the stored state, the armrest 51 is in the folded state, that is, the stored state is one of the folded states. After the clamping strip 521 disengages from the limiting corner 5313, the clamping strip 521 rotates around its hinge point until the snap-fit component 52 rotates to under the bottom surface of the adapter 53, where the rotational angle of the snap-fit component 52 is the fourth preset angle. In this embodiment, in the folded state, the armrest 51 is continuously rotated, and the armrest 51 is rotated to under the adapter 53, thereby completing the folding and storing of the armrest 51, where this state is the stored state. The fourth preset angle is 220°, corresponding to the range of 140°-360°, so that the armrest 51 can be flipped from the upward tilted posture to under the adapter 53, and approaches a horizontal posture to complete the folding and storing, which greatly reduces the vertical space occupied by the folding armrest 5, and facilitates storing the armrest 51 in a small space such as under the seat.

Of course, in order to further enhance the adjustable angle of the armrest 51 in the use state, the range of 140°-180° in the fourth preset angle can be used as the third use state, that is, the armrest can also be gripped manually for transporting within the range of 140°-180°. Regardless of the angle of the armrest 51, the top surface of the bottom frame remains parallel to the ground, ensuring the stability of the objects carried and prevent tilting. Users can flexibly adjust the length and angle of the armrest 51 according to their heights and positions, thereby maintaining an ergonomic and comfortable posture during pushing and pulling, and reducing fatigue during a prolonged use. When storage is required at the vehicle or airplane, the armrest 51 can be retracted to the shortest length and rotated by 270° to finally lie parallel to the bottom surface of the bottom frame, which significantly reduces the overall profile and the space occupied, and facilitates storage, transportation, and carrying.

The armrest 51 can flexibly switch between a plurality of states without untying, pressing switches, or using tools, making operation extremely convenient. The entire process can be completed with one hand, offering intuitive, efficient, and reliable operation, significantly improving user experience and use safety.

Secondly, the snap-fit component 52 further includes the sleeve 55 and the hinge plate 56 connected to the tail end of the sleeve 55, and the two can be integrated into one piece. The head end of the sleeve 55 is sleeved on the armrest 51 and fixed with a screw. The hinge plate 56 is hinged to the ear plate 532 through the hinge rod (not shown in the figures). The free end of the hinge plate 56 is constructed as the first arc end 561. The clamping strip 521 is provided on a side wall of the first arc end 561 or a side wall of the hinge plate 56. Specifically, the free end of the hinge plate 56 is constructed as the first arc end 561, which improves the adaptability of the hinge plate 56 and the adapter 53 during 270° rotation, effectively avoids collision between the two, ensures that only the clamping strip 521 on the adapter 53 can contact the limiting corner 5313 during rotation, and improves the reliability of the rigid limiting or interference sliding fit between the clamping strip 521 and the limiting corner 5313. The clamping strip 521 can extend in the radial direction of the hinge rod. The connection angle between the clamping strip 521 and the hinge plate 56, the length of the clamping strip 521, and the mounting position of the clamping strip 521 on the hinge plate 56 all affect the value of the suspension angle. The clamping strip 521 can be appropriately set according to the required positioning angle of the armrest 51.

Furthermore, the tail end of the sleeve 55 is constructed as the first limiting surface 551 and the second limiting surface 552 that are connected in a V-shaped configuration. The first limiting surface 551 can abut against the top surface of the ear plate 532, and the second limiting surface 552 can abut against the bottom surface of the ear plate 532. Specifically, in the first use state, the first limiting surface 551 abuts against the top surface of the ear plate 532, effectively distributing the force on the latch 533 and improving the service life of the latch 533. When the armrest 51 is manually pushed, the first limiting surface 551 can serve as the force transmission surface, effectively improving the stability of pushing the bottom frame to move. In the stored state, the second limiting surface 552 can abut against the bottom surface of the ear plate 532, preventing the armrest 51 from colliding with the bottom of the bottom frame when the rotational angle of the armrest 51 exceeds 270°, effectively protecting the armrest 51 and the bottom frame.

Furthermore, the pair of ear plates 532 are arranged in parallel on the side plate 5311 of the adapter block 531. The hinge plate 56 is hinged between the pair of ear plates 532. Along the length direction of the armrest 51, the hinge plate 56 is provided with the snap-fit plate 57. The snap-fit slot 5321 is correspondingly formed at a surface of the ear plate 532 facing the hinge plate 56, i.e., the inner wall of the ear plate 532. The snap-fit plate 57 is interference-fitted with the inner wall of the ear plate 532 on the identical side. While the clamping slot 522 engages with the latch 533, the snap-fit plate 57 engages with the snap-fit slot 5321. In this embodiment, a pair of hinge plates 56 cooperate and engage with a pair of snap-fit slots 5321 in one-to-one correspondence. The ear plate 532 may be made of plastic, and the snap-fit plate 57 is interference-fitted with the ear plate 532 on the identical side. This interference fit increases the clamping force of the pair of ear plates 532 on the hinge plate 56, allowing the armrest 51 to be positioned at any position within the second preset angle without falling clockwise, further enhancing the flexibility of using the folding armrest 5. Of course, considering the smoothness of the armrest 51 switching between different states, excessive clamping force is usually not applied to the hinge plate 56 and the ear plate 532 on the identical side, that is, the suspension effect is limited, but it still provides the buffering effect, slowing down the rotational speed of the folding armrest 5, facilitating one-handed operation and improving operational safety.

In the first use state, while the clamping slot 522 engages with the latch 533, the snap-fit plate 57 simultaneously engages with the snap-fit slot 5321, effectively improving the connection strength of the snap-fit component 52 and the adapter 53, and preventing them from accidentally disengaging in the first use state. Moreover, the cooperating structure of the snap-fit plate 57 and the snap-fit slot 5321 can distribute the force of the cooperating structure of the clamping slot 522 and the latch 533. When the armrest 51 is manually pulled, the cooperating structure of the snap-fit plate 57 and the snap-fit slot 5321 can serve as the force transmission surface, effectively improving the stability of pulling the bottom frame to move, and of course, it can also further improve the stability of pushing the bottom frame to move.

Secondly, the first frame insertion slot 5314 is formed on the side plate 5311 of the adapter block 531, and the second frame insertion slot 5315 is formed on the side of the adapter block 531 facing away from its side plate 5311. A plurality of rib plates 5316 are arranged circumferentially on the inner wall of the first frame insertion slot 5314 and/or the second frame insertion slot 5315. Specifically, the first frame insertion slot 5314 and the second frame insertion slot 5315 are inserted correspondingly into the crossbeams or rods on the bottom frame, and then fixed with screws to achieve the fixation of the folding armrest 5 on the bottom frame in a three-dimensional space. Moreover, the plurality of rib plates 5316 are arranged circumferentially on the inner wall of the frame insertion slot, the length directions of the rib plates 5316 are parallel to the axial direction of the frame insertion slot, and the rib plates 5316 protrude toward the inner side of the frame insertion slot, which can improve the connection strength between the frame insertion slot and the frame crossbeam, and improve the reliability of using the folding armrest 5 integrated on the bottom frame.

Optionally, the limiting corner 5313 is constructed as the rounded corner, and the free end of the clamping strip 521 is constructed as the second arc end 5211. When the snap-fit component 52 rotates around the hinge point, the rounded corner can abut against and limit the second arc end 5211, and the second arc end 5211 can also slide against the rounded corner and pass over its apex. Both the limiting corner 5313 and the free end of the clamping strip 521 are constructed as rounded surface structures, which reduces the sliding resistance when the clamping strip 521 slides against the limiting corner 5313 through the interference fit and reduces wear on the two, while also making it more labor-saving for the clamping strip 521 to switch between the two limiting surfaces of the limiting corner 5313.

It should be noted that when the clamping strip 521 slides against the limiting corner 5313 through the interference fit, the point at which the two disengage is the apex of the rounded corner. When the clamping strip 521 passes over the apex of the limiting corner 5313, the folding armrest 5 transitions from the switching state to the second use state or the stored state.

In this embodiment, the armrest 51 can rotate at least 270° around the hinge point of the snap-fit component 52. In the folded state, the snap-fit component 52 can rotate to under the bottom plate 5312 of the adapter block 531. The snap-fit component 52 may abut against and be limited by the bottom plate 5312 of the adapter block 531; or, the armrest 51 may abut against and be limited by the bottom of the bottom frame; or, the armrest 51 may be placed on the ground, and both the armrest 51 and the snap-fit component 52 are not in contact with the bottom plate 5312 of the adapter block 531 and the bottom of the bottom frame.

The folding armrest 5 is provided on a side of the bottom frame 1, so that the folding armrest 5 can flip relative to the top surface of the bottom frame 1. This adapts to alternating use of the folding armrest 5 in the first use state, the second use state, the switching state, the folded state, and the stored state. The armrest 51 can be flipped around the hinge point of the snap-fit component 52 to the bottom of the bottom frame 1 from the vertically upward or tilted upward posture, with the flip angle of at least 270°. Specifically, in the first use state, the angle between the top surface of the bottom frame 1 and the length direction of the armrest 51 can be less than 90°, which adapts to the corresponding push-pull scenario. In the stored state, the length direction of the armrest 51 can be parallel, tilted upward or tilted downward relative to the top surface of the bottom frame 1, which is not restricted in the present invention.

In an embodiment, the bottom frame 1 includes the peripheral frame 12 and the support beam 13 provided inside the peripheral frame 12. The adapter 53 is mounted on the peripheral frame 12. Specifically, the peripheral frame 12 may be a square frame, formed by connecting a plurality of crossbeams. The crossbeam may be a square beam, which is inserted into the first frame insertion slot 5314 and then fixed with a screw. The square beam can improve the mounting accuracy of the folding armrest 5 mounted on the bottom frame 1, thereby improving the positional accuracy of the armrest 51 in various states. The support beams 13 may be of any shape, as long as they can form the support plane on the top surface of the bottom frame 1, or the support beams 13 and the peripheral frame 12 can jointly form the support plane on the top surface of the bottom frame 1.

Secondly, the adapter 53 is mounted on the support beam 13. The support beam 13 is inserted into the second frame insertion slot 5315 and then fixed with a screw, further improving the connection strength between the adapter 53 and the bottom frame 1 and the mounting accuracy of the folding armrest 5 on the bottom frame 1. Optionally, the support beam 13 is perpendicularly connected to the peripheral frame 12 on its connecting side, that is, the first frame insertion slot 5314 and the second frame insertion slot 5315 are perpendicular to each other, and are correspondingly limited by the crossbeam of the peripheral frame 12 and the support beam 13 that are perpendicular to each other, so that the adapter 53 can be mounted on the T-shaped beam. This effectively improves the overall stability of the folding trailer when the armrest 51 is dragged in various directions, preventing movement between components.

Optionally, a pair of support beams 13 are arranged in parallel on the inner side of the bottom frame 1, and a pair of adapters 53 are mounted on the pair of support beams 13 in one-to-one correspondence. Specifically, a pair of folding armrests 5 are mounted on a pair of T-shaped beams of the bottom frame 1 in one-to-one correspondence. Compared to embodiments where a single folding armrest 5 is mounted correspondingly on a single T-shaped beam, such as embodiments where the bottom end of the armrest 51 is constructed as the Y-shaped structure, an additional folding armrest 5 is connected to the bottom frame 1 to further improve the overall stability of the folding trailer during movement and enhances its adaptability for transporting heavy-duty items.

It should be understood that the above description of specific embodiments of the present invention is only for illustrating the technical approach and features of the present invention, and is intended to enable those skilled in the art to understand the content of the present invention and implement it accordingly. However, the present invention is not limited to the specific embodiments described above. All changes or modifications made within the scope of the claims of the present invention shall fall within the protection of scope of the present invention.

What is claimed is:

1. A trailer frame, wherein the trailer frame comprises a bottom frame, a snap-fit rod, and a pair of brackets;

the pair of brackets are correspondingly provided on both sides of the bottom frame; and two free ends of each of the pair of brackets are correspondingly hinged to the bottom frame, so that the pair of brackets are configured to flip toward an inner side of a top surface of the bottom frame; and a hinged end of the snap-fit rod is hinged to a bracket on an identical side; a snap-fit end of the snap-fit rod is configured to engage with or disengage from a bracket on an opposite side, and the snap-fit end of the snap-fit rod is further configured to flip toward a plane where the bracket is located.

2. The trailer frame according to claim 1, wherein the trailer frame comprises a use state;

in the use state, the snap-fit end of the snap-fit rod engages with the bracket on the opposite side, so that the top surface of the bottom frame, the snap-fit rod, and the pair of brackets enclose a storage space.

3. The trailer frame according to claim 1, wherein the trailer frame comprises a folded state;

in the folded state, the snap-fit end of the snap-fit rod disengages from the bracket on the opposite side, the snap-fit rod flips toward the bracket on the identical side, and the pair of brackets flip toward the inner side of the top surface of the bottom frame, so that the bracket and/or the snap-fit rod correspondingly abut against the top surface of the bottom frame; and the trailer frame is configured to switch between the folded state and a use state.

4. The trailer frame according to claim 1, wherein each of the pair of brackets is constructed as a U-shaped bracket; and the hinged end of the snap-fit rod is hinged to a corner of the bracket on the identical side, and the snap-fit end of the snap-fit rod is configured to engage with or disengage from a corner of the bracket on the opposite side.

5. The trailer frame according to claim 4, wherein the snap-fit end of the snap-fit rod engages with a snap-fit cylinder, and the snap-fit cylinder is provided at the corner of the bracket on the opposite side;

the snap-fit end of the snap-fit rod is constructed as a clamping block, and the snap-fit cylinder is correspondingly provided with a clamping block slot matched with the clamping block; and the snap-fit rod is configured to rotate around the hinged end, so that the clamping block engages with or disengages from the clamping block slot.

6. The trailer frame according to claim 5, wherein the clamping block and the clamping block slot are correspondingly constructed as a T-shaped clamping block and a T-shaped clamping block slot.

7. The trailer frame according to claim 5, wherein each of the pair of brackets comprises a main bracket, a pair of auxiliary brackets, and a pair of dual-passage sleeves; and the pair of dual-passage sleeves are provided at two corners of each of the pair of brackets in one-to-one correspondence; and the main bracket and the pair of auxiliary brackets are connected through the pair of dual-passage sleeves.

8. The trailer frame according to claim 7, wherein the hinged end of the snap-fit rod is hinged with a hinge cylinder, and the hinge cylinder is provided at the corner of the bracket on the identical side; and each of the pair of dual-passage sleeves is provided with a plurality of connecting cylinders, and one of the plurality of connecting cylinders is correspondingly detachably connected to the snap-fit cylinder or the hinge cylinder.

9. The trailer frame according to claim 8, wherein the snap-fit cylinder and/or the hinge cylinder are configured to flip onto the top surface of the bottom frame.

10. The trailer frame according to claim 1, wherein a plurality of second hinge cylinders (11) are provided on the top surface of the bottom frame; and the plurality of second hinge cylinders are hinged with free ends of each of the pair of brackets.

11. The trailer frame according to claim 10, wherein a sum of height sizes of the pair of brackets is less than or equal to a distance between second hinge cylinders on an identical side of the pair of brackets.

12. The trailer frame according to claim 1, wherein the top surface of the bottom frame is constructed as a support surface; and the support surface, the pair of brackets, and a pair of snap-fit rods are configured to enclose a cuboid frame.

13. The trailer frame according to claim 1, wherein at least one pair of universal wheels are detachably provided at a bottom of the bottom frame.

14. A combined trailer, wherein the combined trailer comprises the trailer frame according to claim 1.

15. The combined trailer according to claim 14, wherein the combined trailer further comprises a pet carrier bag; and the bottom frame, the snap-fit rod, and the pair of brackets cover an outer side of the pet carrier bag.

16. The combined trailer according to claim 14, wherein the combined trailer further comprises a folding armrest; and the folding armrest is mounted on the bottom frame, and the folding armrest is configured to rotate from a vertically upward posture to a bottom of the bottom frame.

17. The combined trailer according to claim 16, wherein the folding armrest comprises an armrest, a snap-fit component, and an adapter;

a first end of the snap-fit component is connected to the armrest, and a second end of the snap-fit component is hinged to the adapter; the adapter has a rotational space, wherein the snap-fit component rotates in the rotational space, and a limiting corner is provided within the rotational space; and the snap-fit component is provided with a clamping strip corresponding to the limiting corner; and during rotation of the snap-fit component around a hinge point of the snap-fit component, the following sequence occurs:

the clamping strip abuts against and is limited by the limiting corner, and the armrest is in a suspended position; and the clamping strip slides against the limiting corner and passes over an apex of the limiting corner, and the armrest enters a folded state.

18. The combined trailer according to claim 17, wherein the folding armrest comprises a first use state and a second use state, and the rotational space comprises a first preset angle and a second preset angle;

in the first use state, the snap-fit component engages with the adapter, the adapter is perpendicular to the armrest, and a rotational angle of the snap-fit component from engaging with the adapter to disengaging from the adapter is the first preset angle; and in the second use state, the snap-fit component disengages from the adapter, the snap-fit component is configured to rotate around the hinge point of the snap-fit component until the clamping strip abuts against and is limited by the limiting corner, wherein a rotational angle of the snap-fit component is the second preset angle.

19. The combined trailer according to claim 17, wherein the folding armrest further comprises a switching state, and the rotational space further comprises a third preset angle; and in the switching state, the snap-fit component is configured to rotate around the hinge point of the snap-fit component, while the clamping strip slides against the limiting corner through an interference fit, and a rotational angle of the snap-fit component from abutting to disengagement of the clamping strip and the limiting corner is the third preset angle.

20. The combined trailer according to claim 17, wherein the folding armrest further comprises a stored state, and the rotational space further comprises a fourth preset angle; and in the stored state, the armrest is in the folded state; after the clamping strip disengages from the limiting corner, the clamping strip rotates around a hinge point of the clamping strip until the snap-fit component rotates to under a bottom surface of the adapter, wherein a rotational angle of the snap-fit component is the fourth preset angle.

* * * * *